United States Patent
Guo

(10) Patent No.: US 12,395,215 B2
(45) Date of Patent: Aug. 19, 2025

(54) ANTENNA CALIBRATION SCHEDULING IN ADVANCED ANTENNA SYSTEMS

(71) Applicant: Telefonaktiebolaget LM Ericsson (publ), Stockholm (SE)

(72) Inventor: Shiguang Guo, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 386 days.

(21) Appl. No.: 18/005,108

(22) PCT Filed: Aug. 5, 2020

(86) PCT No.: PCT/IB2020/057413
§ 371 (c)(1),
(2) Date: Jan. 11, 2023

(87) PCT Pub. No.: WO2022/029470
PCT Pub. Date: Feb. 10, 2022

(65) Prior Publication Data
US 2023/0268967 A1    Aug. 24, 2023

(51) Int. Cl.
H04B 7/06        (2006.01)
H04B 17/12       (2015.01)
H04L 5/00        (2006.01)

(52) U.S. Cl.
CPC ......... H04B 7/0617 (2013.01); H04B 17/12 (2015.01); H04L 5/0023 (2013.01)

(58) Field of Classification Search
CPC ...... H04B 7/0617; H04B 17/12; H04L 5/0023
USPC ........................................................ 455/121
See application file for complete search history.

(56) References Cited

U.S. PATENT DOCUMENTS

| | | | |
|---|---|---|---|
| 10,263,330 B2* | 4/2019 | Martikkala | H01Q 21/00 |
| 11,115,136 B1* | 9/2021 | Kim | H04B 17/13 |
| 2015/0351115 A1* | 12/2015 | Jeon | H04W 16/14 |
| | | | 455/450 |
| 2016/0020817 A1* | 1/2016 | Chen | H04B 17/12 |
| | | | 370/278 |
| 2016/0294488 A1* | 10/2016 | Sun | H04B 17/14 |
| 2020/0177287 A1 | 6/2020 | Yu et al. | |

FOREIGN PATENT DOCUMENTS

WO    2014/198037 A1    12/2014

OTHER PUBLICATIONS

International Search Report and Written Opinion dated Apr. 16, 2021 issued in PCT Application No. PCT/IB2020/057413 filed Aug. 5, 2020, consisting of 15 pages.

(Continued)

*Primary Examiner* — Don N Vo
(74) *Attorney, Agent, or Firm* — Sonoda & Kobayashi Intellectual Property Law; Sarvajit S. Patil

(57) ABSTRACT

According to one or more embodiments, a network node is provided. The network node is configured to: indicate time and frequency domain resources for a first antenna calibration, AC, window; after the indication and before the first AC window, determine whether to perform an AC measurement in the first AC window using the indicated time and frequency domain resources; and indicate the determination, using in-band signaling, whether to perform the AC measurement in the first AC window.

20 Claims, 19 Drawing Sheets

(56) References Cited

OTHER PUBLICATIONS

3GPP TS 36.213 V13.6.0 (Jun. 2017) 3rd Generation Partnership Project; Technical Specification Group Radio Access Network; Evolved Universal Terrestrial Radio Access (E-UTRA); Physical layer procedures (Release 13), consisting of 390 pages.
3GPP TS 38.214 V15.0.0 (Dec. 2017) 3rd Generation Partnership Project; Technical Specification Group Radio Access Network; NR; Physical layer procedures for data (Release 15), consisting of 71 pages.
O-RAN Alliance e.V; Transforming Radio Access Networks Towards Open, Intelligent, Virtualized and Fully Interoperable RAN, Session Replays of the O-RAN Next Generation Research Group Workshop, Madrid 2022, consisting of 6 pages.

\* cited by examiner

ANTENNA CALIBRATION SCHEDULING IN ADVANCED ANTENNA SYSTEMS

CROSS-REFERENCE TO RELATED APPLICATIONS

This application is a Submission Under 35 U.S.C. § 371 for U.S. National Stage Patent Application of International Application Number: PCT/IB2020/057413, filed Aug. 5, 2020 entitled "ANTENNA CALIBRATION SCHEDULING IN ADVANCED ANTENNA SYSTEMS," the entirety of which is incorporated herein by reference.

TECHNICAL FIELD

Wireless communication and in particular, antenna calibration (AC) in advanced antenna system (AAS).

BACKGROUND

Massive MIMO and Beamforming

Active antenna system (AAS) is one technology that has been adopted by the $3^{rd}$ Generation Partnership Project (3GPP) $4^{th}$ generation (4G) Longer Term Evolution (LTE) and $5^{th}$ Generation (5G) New Radio (NR) standards to enhance the wireless network performance and capacity by using full dimension Multiple Input Multiple Output (FD-MIMO) or massive MIMO. A typical AAS system includes a two-dimensional antenna element array with M rows, N columns and K polarizations (K=2 in case of cross-polarization) as illustrated in FIG. 1.

The codebook-based precoding in AAS is based on a set of pre-defined precoding matrices. The precoding matrix indication (PMI) may be selected by the wireless device with downlink (DL) channel state information-reference signal (CSI-RS), or by network node with uplink (UL) reference signals.

The precoding matrix, denoted as W, may be further described as for example a two-stage precoding structure as follows:

$$W = W_1 W_2.$$

The first stage of the precoding structure, i.e., $W_1$, may be described as a codebook, and consists essentially of a group of 2D grid-of-beams (GoB), which may be characterized as $$W_1 = \begin{bmatrix} w_h \otimes w_v & 0 \\ 0 & w_h \otimes w_v \end{bmatrix}$$

where $w_h$ and $w_v$ are precoding vectors selected from over-sampled DFT for horizontal direction and vertical direction, respectively, and may be expressed by $$w_v = \frac{1}{\sqrt{M}} \left[ 1, e^{\frac{j2\pi v}{MO_1}}, \ldots, e^{\frac{j2\pi mv}{MO_1}}, \ldots, e^{\frac{j2\pi(M-1)v}{MO_1}} \right]^T$$

$$w_h = \frac{1}{\sqrt{N}} \left[ 1, e^{\frac{j2\pi h}{NO_2}}, \ldots, e^{\frac{j2\pi mv}{NO_2}}, \ldots, e^{\frac{j2\pi(N-1)h}{NO_2}} \right]^T$$

where $O_1$ and $O_2$ are the over-sampling rate in vertical and horizontal directions, respectively.

The second stage of the precoding matrix, i.e. $W_2$, is used for beam selection within the group of 2D GoB as well as the associated co-phasing between two polarizations.

In NR, $W_1$ may be determined according to a wireless device PMI report of i1. $W_2$ may be determined according to a wireless device PMI report of i2. The wireless device may feed back PMI to a network node. The network node may apply a corresponding precoder for the transmission after receiving the wireless device feedback.

Antenna Calibration (AC) Purpose and Realization

One purpose of the antenna calibration is to remove long term radio frequency (RF) phase differences between transmit/transmission TX paths caused by delay differences in the different signal paths and phase difference in mixers and filters, etc. Antenna calibration helps to enable massive MIMO and beam forming features, which rely on proper amplitude and phase aligned signals at the antenna while delay or phase may change over time mainly due to temperature change. Antenna calibration may be useful for good performance of massive MIMO and beamforming.

FIG. 2 is a diagram illustrating a cross-polarization antenna configuration. There are two pairs of antennas in this example where there is both phase error and delay error. The description below described one reason why antenna calibration for beamforming.

Phase error on antenna port I={0,1,2,3}:

$$P_i = 2\pi f t_i + \theta_i$$

Delay difference between antenna ports for both polarization A and B. Port 0 and 1 are for polarization A. Port 2 and 3 are for polarization B. Delay for each polarization is represented by:

$$\Delta t_A = t_0 - t_1$$

$$\Delta t_B = t_2 - t_3$$

Phase error difference between antenna ports for each polarization is:

$$\Phi_A(f) = 2\pi f \Delta t_A + \theta_0 - \theta_1$$

$$\Phi_B(f) = 2\pi f \Delta t_B + \theta_2 - \theta_3$$

Phase error difference between the two polarization is:

$$\Phi_{AB}(f) = \Phi_A(f) - \Phi_B(f)$$

When there is no phase error between the two polarizations, most precoders are beam-aligned as illustrated in FIG. 3.

When there is non-equal phase difference between the two polarizations, beam-aligned precoders become misaligned as illustrated in FIG. 4, and calibration is needed.

Phase error between two polarization:

$$\theta_{AB} = \theta_A - \theta_B$$

Antenna calibration in a general context means aligning the radio chains, from digital baseband to antenna, in amplitude, delay and phase for all the antennas. An overview of AC is illustrated in FIG. 5. The calibration function may compensate for delay and phase differences between any antenna branches, originating from the entire transmitter chain. The amplitude alignment is addressed by the normal output power control.

Referring back to FIG. 5, the logical components of antenna calibration such as AC control, AC algorithm, etc., are described in more detail below. AC control 2 is configured to configure and coordinate AC for different components. Before AC actions, configurations may need be ready for all components. AC control 2 configures and triggers AC measurements 4 for active carriers, and configures compensation based on measurement results. AC algorithm 6 is configured to calculate compensation weights based on measurement data. The compensation weights may then be used by the AC compensation 8 component. AC scheduling 10 is configured to determine radio resources in time and frequency domain where AC measurement 4 should occur. The AC scheduling 10 may schedule AC measurement 4 signals with fine granularity into specific parts of the traffic data pattern. AC measurement 4 is configured to inject and capture AC signals. For example, in downlink, the AC measurement 4 may inject a signal which is predefined at baseband into the radio. At the antenna, there is a coupler where the injected signal is tapped off. The tapped signal is looped back to baseband and sent to AC algorithm 6 component to calculate the compensation weights. AC compensation 8 is configured to compensate the precoding of the traffic data to eliminate measured calibration errors. The AC compensation 8 may apply the compensation weights in beamforming operations.

A typical AC realization in active antenna system (AAS) 14 and DU 12 is illustrated in FIG. 6 where AC scheduling 10 (a logical component) is in DU 12 since scheduling occurs in the DU 12. the AAS 14 integrates radio unit 16 (RU 16) and antenna unit 18 (AU 18) with certain baseband (BB) capability. AAS 14 communicates with a digital unit 12 (DU 12) using a packet-based connection, such as Ethernet. AAS 14 and DU 12 could be co-located or far away (i.e., non-co-located). Typically, there are two types of connections between DU 12 and AAS 14, which are a control path and data path. The control path is configured to deliver messages used for configuration. The data path is configured to deliver user traffic data.

Open Radio Access Network (ORAN)

Open RAN (ORAN) is an international collaboration among entities to allow mobile operators to use O-DU and O-RU from different vendors. O-DU refers to an ORAN compatible DU 12. O-RU refers to an ORAN compatible RU 16 such as AAS 14. ORAN provides various benefits for operators to deploy networks. One benefit is the possibility to optimize the cost structure by deploying DU 12 or AAS 14 from different vendors so that the operator is not stuck with a single vendor for both DU 12 and AAS 14 such as due to a lack of choices for DU 12 and AAS 14. The general components of an ORAN capable network node and the management system are well known such that they will not be described in detail herein.

To enable O-DU and O-RU from different vendors working together, standardization may be needed to define the interface between RU 16 and AAS 14. AC operation may be supported by the management interface (IIs-M) as shown in FIG. 7. In general, O-RU requests an AC allowance (time and frequency resources for AC) from O-DU. The scheduler on O-DU provides the AC allowance to O-RU.

AC Scheduling Procedure

AC may require time/frequency domain radio resources for AC signals that are sent and/or received. These radio resources may be determined by the scheduler in DU 12 to coordinate with resources for "normal" traffic. FIG. 8 is a signaling diagram of an AC scheduling procedure from DU 12 and AAS 14 assuming the C2 interface is implemented. As illustrated in FIG. 8, AC SW 20 (AC Software 20 component) in AAS 14 sends the AC allowance request to the DU 12 where the AC allowance requests is asking/requesting for AC resources. This request may be sent periodically. UPC 22 is the AC SW 20 component for scheduler, where AC scheduling occurs. RPC 24 and RCC 26 are the communication SW agents at DU 12 and AAS 14 respectively. The AC allowance request specifies the minimum number of AC blocks and the minimum interval between two adjacent blocks. Each AC block represents one or multiple antenna branches. After receiving the AC allowance, RCC 26 forwards the AC allowance to the BBSC 28 (baseband SW 28 component) to continue the AC measurement and rest of the AC process. After the AC allowance request is received, the scheduler, represented by UPC 22 in FIG. 8, prepares AC allowance and send it back to the AAS 14.

FIG. 9 is a diagram illustrating time/frequency domain resources that are allocated for AC. It may be assumed that the full bandwidth is used. These time domain resources are referred to as the AC allowance where the AC allowance may correspond to multiple AC blocks with gaps in between. Each AC block, also called a SCG, consists of a set of OFDM symbols. The remaining OFDM symbols within a block are used for traffic. One block may be for a group of antenna branches. Multiple AC blocks may be used for all the antennas.

In a typical deployment, DU 12 and AAS 14 could be deployed close (i.e., co-located) or far away (i.e., non-co-located) from each other. In addition, the DU 12 may handle a different traffic load over time where the processing times for the AC messages may differ due to different traffic volume level. Therefore, latency between the AC control 2 component inside AAS 14 and the AC scheduling 10 component (i.e., scheduler) inside the DU 12 may be different from time to time and from site to site.

Timing of different AC steps in DU 12 is illustrated in FIG. 10 where multiple time stamps are shown. In particular, the scheduler receives an AC allowance request at T_allow_req. In order to account for the latency from AC scheduling 10 component at DU 12 to AC control 2 component at AAS 14, represented as T_Latency, scheduler at DU 12 may need to provide an AC allowance in advance to account the communication latency from DU to AAS and send the AC allowance to the AAS 14 as soon as possible. For the AC allowance, the actual AC occurrence time referred to as T_AC. T_AC should be greater than T_allow_req+T_Latency such as, for example, to provide enough time to receive and process the AC allowance. In FIG. 10, AC regions correspond to the time duration when multiple AC blocks occur.

Once AC scheduling 10 receives the AC allowance request, the AC scheduling 10 prepares an AC allowance based on latency T_Latency and all pre-defined configuration information, such as common channels which are network configured. These common channels are periodic in time such that their occurrence can be predicted in advance. One aim in the scheduling of AC resources is to try to avoid using/scheduling resources reserved for the common channels as AC resources. One example of such as common channel is the synchronization and broadcasting channel.

However, there are many traffic types that are very critical, or delay sensitive as indicated in FIG. 10 where these traffic types cannot or should not be delayed. The occurrence of these traffic types may not be able to be predicted in advance when the AC allowance is created by scheduler at an earlier time. They can only be known to scheduler within a few milliseconds, i.e., close to the time AC will occur and after the allowance is already sent to AAS. This means that the above AC allowance predicted in advance could have conflict with these channels.

Examples of such critical or delay sensitive channels which are latency sensitive are listed below for both DL and UL and may include:

Disaster messages such as tsunami and earthquake warning in the DL 911 in the DL Delay based scheduling for Voip in both the DL and UL RACH related signaling for both the DL and UL HARQ in both the DL and UL ULLR (ultra-latency and ultra-reliability) in both the UL and DL RACH related messages in the UL.

SUMMARY

Some embodiments advantageously provide methods, systems, and apparatuses for AC in AAS. According to one or more embodiments, one or more of the following steps are performed:

Determine the Latency from DU to AAS.

Determine an allowance in advance and send it to AAS as soon as possible.

At the time close to AC, decide if there is conflict between previously determined AC allowance and critical or delay sensitive traffic.

The allowance AC candidate could be dropped or kept. Send the decision using in-band signaling before the first AC block.

Send final decision immediately (rejected or confirmed) after AC via higher layer control path through RPC and RCC.

AAS perform symbol energy detection on the pre-AC window to determine whether AC measurement should be performed.

AAS perform final AC algorithm and compensation after receiving final decision message in high layer control path.

Change of AC Period can also be recommended to RU as part of rejection message which Retransmission of AC request could be allowed if AC is rejected.

According to one aspect of the disclosure, a network node is provided. The network node is configured to: indicate time and frequency domain resources for a first antenna calibration, AC, window; after the indication and before the first AC window, determine whether to perform an AC measurement in the first AC window using the indicated time and frequency domain resources; and indicate the determination, using in-band signaling, whether to perform the AC measurement in the first AC window.

According to one or embodiments of this aspect, the in-band signaling uses at least one resource in a predefined pre-AC window to signal the determination. According to one or embodiments of this aspect, the indication of the determination to not perform the AC measurement in the first AC window is provided by the at least one resource being configured with a power greater than a predefined threshold. According to one or embodiments of this aspect, the indication of the determination to perform the AC measurement in the first AC window is provided by the at least one resource being configured with a power less than a predefined threshold.

According to one or embodiments of this aspect, the at least one resource is at least one orthogonal frequency-division multiplexing, OFDM, resource corresponding to a symbol of at least a subband at an end of a slot. According to one or embodiments of this aspect, the determination whether to perform the AC measurement in the first AC window is based at least on whether the time and frequency domain resources for the first AC window collide with delay sensitive data traffic. According to one or embodiments of this aspect, the network node includes a logical distributed unit, DU, and logical remote unit, RU, the in-band signaling corresponding to in-band signaling from the logical DU to logical RU.

According to one or embodiments of this aspect, the logical DU is one of physically separate from the RU and physically collocated with the RU. According to one or embodiments of this aspect, the network node is further configured to determine a communication latency between the logical DU to the logical RU, and the time and frequency domain resources for the first AC window is based on the determined communication latency. According to one or embodiments of this aspect, the network node is further configured to: perform the AC measurement in the first AC window; at least temporarily store the AC measurement; and at least temporarily pause AC the uses of the AC measurement until a control plane confirmation indication has been received.

According to another aspect of the disclosure, a method implemented by a network node is provided. Time and frequency domain resources for a first antenna calibration, AC, window are indicated. After the indication and before the first AC window, a determination is performed as to whether to perform an AC measurement in the first AC window using the indicated time and frequency domain resources. The determination whether to perform the AC measurement in the first AC window is indicated using in-band signaling.

According to one or embodiments of this aspect, the in-band signaling uses at least one resource in a predefined pre-AC window to signal the determination. According to one or embodiments of this aspect, the indication of the determination to not perform the AC measurement in the first AC window is provided by the at least one resource being configured with a power greater than a predefined threshold. According to one or embodiments of this aspect, the indication of the determination to perform the AC measurement in the first AC window is provided by the at least one resource being configured with a power less than a predefined threshold.

According to one or embodiments of this aspect, the at least one resource is at least one orthogonal frequency-division multiplexing, OFDM, resource corresponding to a symbol of at least a subband at an end of a slot. According to one or embodiments of this aspect, the determination whether to perform the AC measurement in the first AC window is based at least on whether the time and frequency domain resources for the first AC window collide with delay sensitive data traffic. According to one or embodiments of this aspect, the network node includes a logical distributed unit, DU, and logical remote unit, RU, the in-band signaling corresponding to in-band signaling from the logical DU to logical RU.

According to one or embodiments of this aspect, the logical DU is one of physically separate from the RU and physically collocated with the RU. According to one or embodiments of this aspect, a communication latency between the logical DU to the logical RU is determined. The time and frequency domain resources for the first AC window is based on the determined communication latency. According to one or embodiments of this aspect, the AC measurement is performed in the first AC window. The AC measurement is at least temporarily stored. The use of the AC measurement is at least temporarily paused until a control plane confirmation indication has been received.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 2:
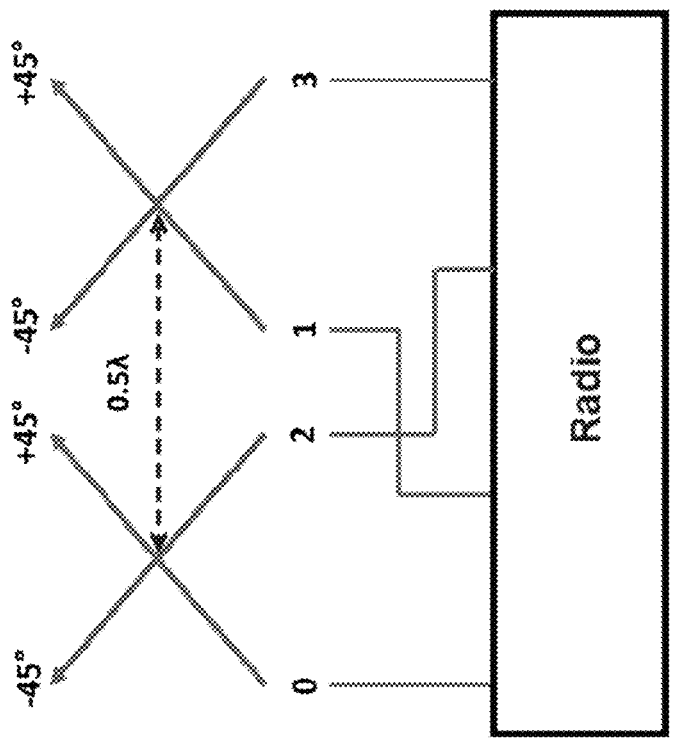
FIG. 2 is a diagram of a cross-polarization antenna array.
Figure 1:
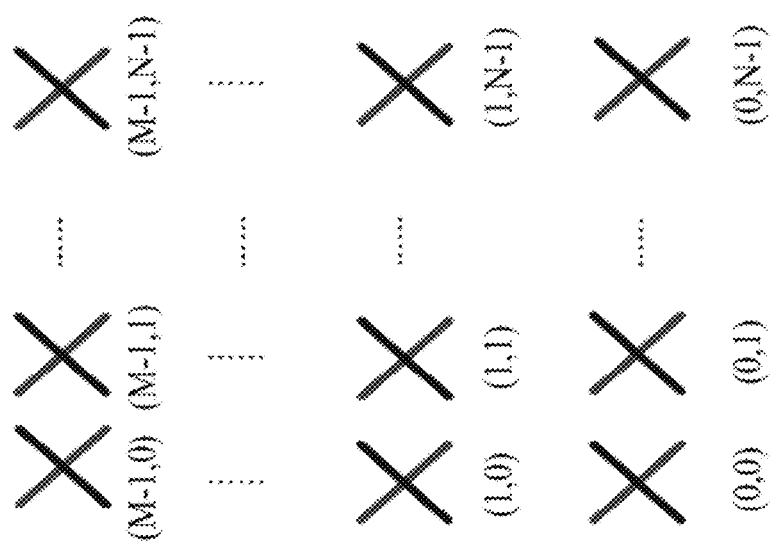
FIG. 1 is a diagram of a two-dimensional antenna element array.
Figure 3:
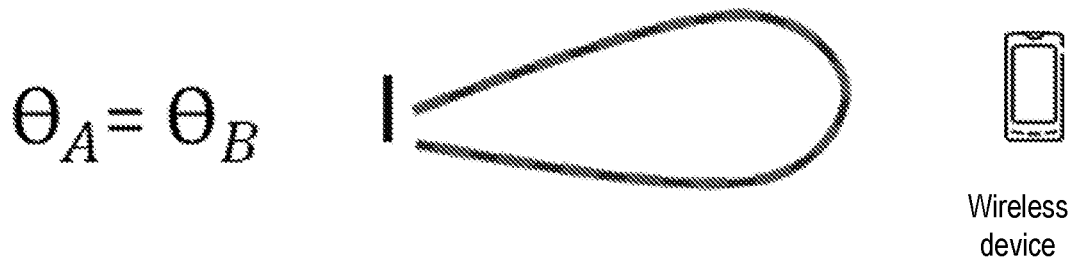
FIG. 3 is a diagram of beamforming when phases of the two polarizations are aligned.
Figure 4:
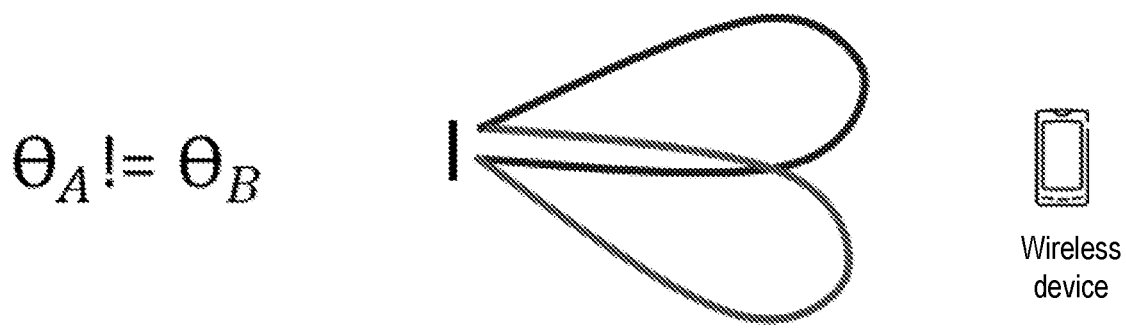
FIG. 4 is a diagram of beams when phases of the two polarizations are not aligned.
Figure 5:
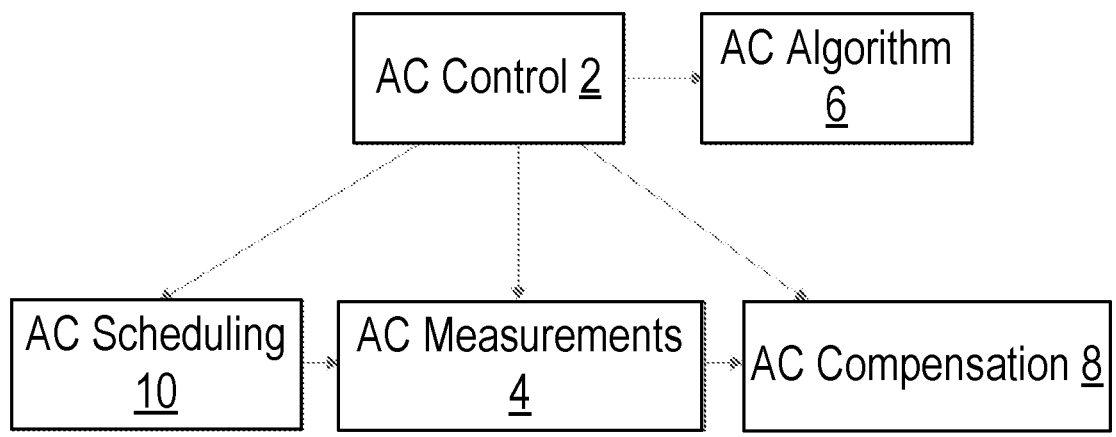
FIG. 5 is a block diagram of antenna calibration logical components.

In the real world, delay sensitive traffic may be unpredictable where, in some cases, the AC may collide with this delay sensitive traffic that is associated with critical channels. To respect this critical or delay sensitive traffic, the AC may be dropped. If the AC is not dropped, dropping critical and delay sensitive traffic could result in legal action and/or major key performance indicators (KPI) degradation, especially in a high traffic load scenario. Therefore, there is a need for the AC to be dropped for this type of delay sensitive traffic. If the AC is dropped, the AAS should be notified immediately to avoid colliding critical traffic with AC symbols. Otherwise, if both AC and critical traffic happen, both will likely not work well.

One or more embodiments of the instant disclose solve at least one of the problems associated with AC scheduling and/or delay sensitive traffic. One or embodiments of the instant disclosure may provide one or more of the following advantages as compared with other arrangements:

provides a method to for robust AC performance when AC uses both DU and AAS and a packet based signaling interface.

may be applied to situations where the DU and AAS are not co-located and far away from each other.

may be able to handle varying latency between DU and AAS for different traffic conditions and help ensure that not only critical or delay sensitive traffic are protected, but also AC performance is ensured.

helps ensure good ORAN performance.

Before describing in detail exemplary embodiments, it is noted that the embodiments reside primarily in combinations of apparatus components and processing steps related to AC in AAS such as for one or more of AC scheduling, configuration, management, etc. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide AC scheduling/configuration/management such as in AAS.

Figure 11:
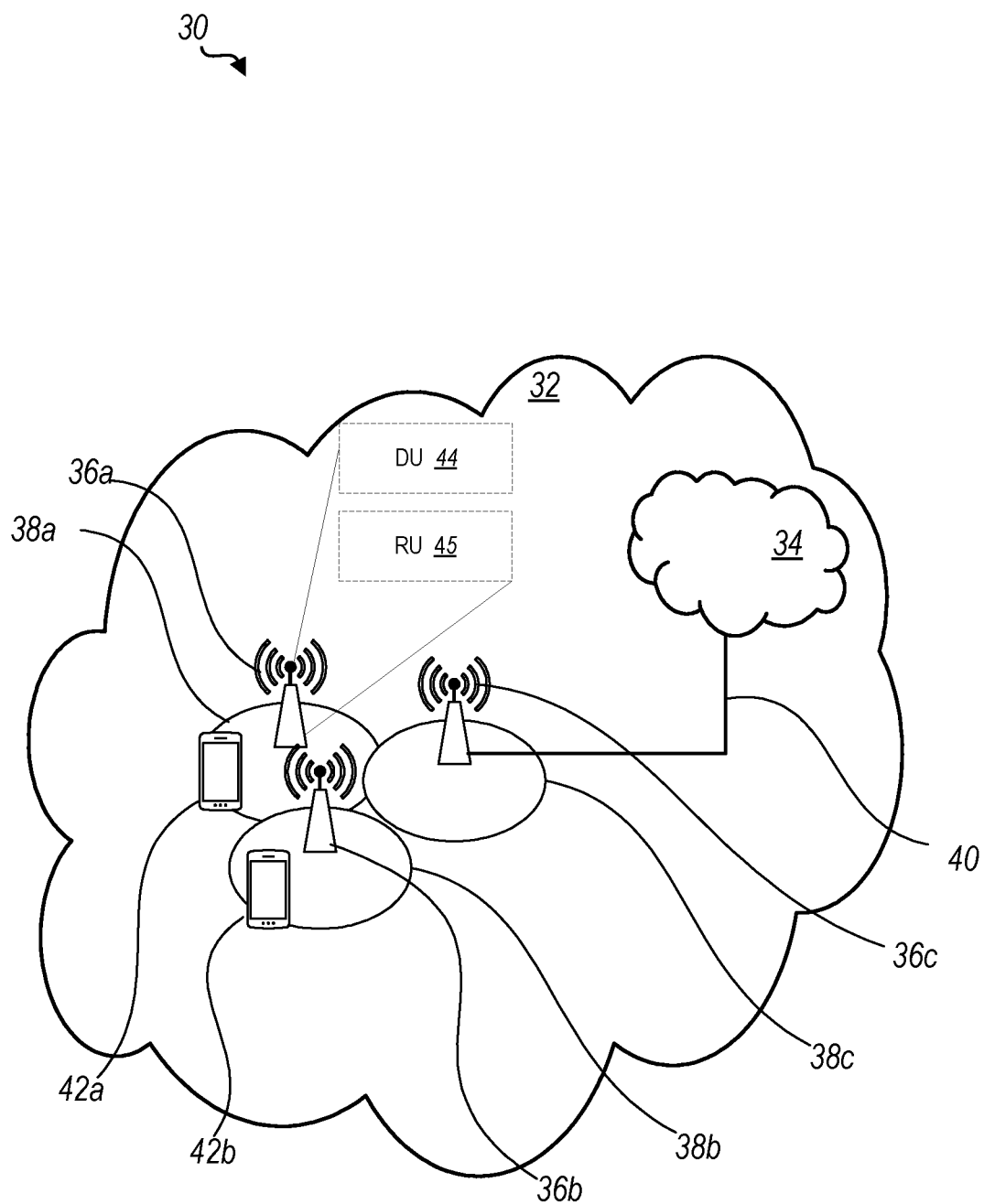
FIG. 11 is a schematic diagram of an exemplary network architecture illustrating a communication system according to the principles in the present disclosure.

Referring again to the drawing figures, in which like elements are referred to by like reference numerals, there is shown in FIG. 11 a schematic diagram of a communication system 30, according to an embodiment, such as a 3GPP-type cellular network that may support standards such as LTE and/or NR (5G), which comprises an access network 32, such as a radio access network, and a core network 34. The access network 32 comprises a plurality of network nodes 36a, 36b, 36c (referred to collectively as network nodes 36), such as NBs, eNBs, gNBs or other types of wireless access points, each defining a corresponding coverage area 38a, 38b, 38c (referred to collectively as coverage areas 38). Each network node 36a, 36b, 36c is connectable to the core network 34 over a wired or wireless connection 40. A first wireless device (WD) 42a located in coverage area 38a is configured to wirelessly connect to, or be paged by, the corresponding network node 36a. A second WD 42b in coverage area 38b is wirelessly connectable to the corresponding network node 36b. While a plurality of WDs 42a, 42b (collectively referred to as wireless devices 42) are illustrated in this example, the disclosed embodiments are equally applicable to a situation where a sole WD is in the coverage area or where a sole WD is connecting to the corresponding network node 36. Note that although only two WDs 42 and three network nodes 36 are shown for convenience, the communication system may include many more WDs 42 and network nodes 36.

Also, it is contemplated that a WD 42 can be in simultaneous communication and/or configured to separately communicate with more than one network node 36 and more than one type of network node 36. For example, a WD 42 can have dual connectivity with a network node 36 that supports LTE and the same or a different network node 36 that supports NR. As an example, WD 42 can be in communication with an eNB for LTE/E-UTRAN and a gNB for NR/NG-RAN.

A network node 36 is configured to include a distributed unit 44 (DU 44) which is configured to perform one or more network node 36 functions as described herein such as with respect AC in AAS. A network node 36 is configured to include a radio unit 45 (RU 45) which is configured to perform one or more network node 36 functions as described herein such as with respect AC in AAS.

Example implementations, in accordance with an embodiment, of the WD 42 and network node 36 discussed in the preceding paragraphs will now be described with reference to FIG. 12. In a communication system 30, network node 36 is provided and includes hardware 46 enabling it to communicate with one or more other network nodes 36 and with the WD 42. The hardware 46 may include a communication interface 48 for setting up and maintaining a wired or wireless connection with an interface of a different communication device of the communication system 30, as well as a radio interface 50 for setting up and maintaining at least a wireless connection 51 with a WD 42 located in a coverage area 38 served by the network node 36. The radio interface 50 may be formed as or may include, for example, one or more RF transmitters, one or more RF receivers, and/or one or more RF transceivers. The communication interface 48 may be configured to facilitate a connection to one or more other entities in communication system 30 such as with another network node 36 and/or with core network 34.

In the embodiment shown, the hardware 46 of the network node 36 further includes processing circuitry 52. The processing circuitry 52 may include a processor 54 and a memory 56. In particular, in addition to or instead of a processor, such as a central processing unit, and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 54 may be configured to access (e.g., write to and/or read from) the memory 56, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 36 further has software 58 stored internally in, for example, memory 56, or stored in external memory (e.g., database, storage array, network storage device, etc.) accessible by the network node 36 via an external connection. The software 58 may be executable by the processing circuitry 52. The processing circuitry 52 may be configured to control any of the methods and/or processes described herein and/or to cause such methods, and/or processes to be performed, e.g., by network node 36. Processor 54 corresponds to one or more processors 54 for performing network node 36 functions described herein. The memory 56 is configured to store data, programmatic software code and/or other information described herein. In some embodiments, the software 58 may include instructions that, when executed by the processor 54 and/or processing circuitry 52, causes the processor 54 and/or processing circuitry 52 to perform the processes described herein with respect to network node 36. For example, processing circuitry 52 of the network node 36 may include DU 44 configured to perform one or more network node 36 functions as described herein such as with respect to AC in AAS. For example, processing circuitry 52 of the network node 36 may include RU 45 configured to perform one or more network node 36 functions as described herein such as with respect to AC in AAS.

The communication system 30 further includes the WD 42 already referred to. The WD 42 may have hardware 60 that may include a radio interface 62 configured to set up and maintain a wireless connection 51 with a network node 36 serving a coverage area 38 in which the WD 42 is currently located. The radio interface 62 may be formed as or may include, for example, one or more RF transmitters, one or more RF receivers, and/or one or more RF transceivers.

The hardware 60 of the WD 42 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 42 may further comprise software 70, which is stored in, for example, memory 68 at the WD 42, or stored in external memory (e.g., database, storage array, network storage device, etc.) accessible by the WD 42. The software 70 may be executable by the processing circuitry 64. The software 70 may include a client application 72. The client application 72 may be operable to provide a service to a human or non-human user via the WD 42. The client application 72 may interact with the user to generate the user data that it provides.

The processing circuitry 64 may be configured to control any of the methods and/or processes described herein and/or to cause such methods, and/or processes to be performed, e.g., by WD 42. The processor 66 corresponds to one or more processors 66 for performing WD 42 functions described herein. The WD 42 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 42.

Figure 12:
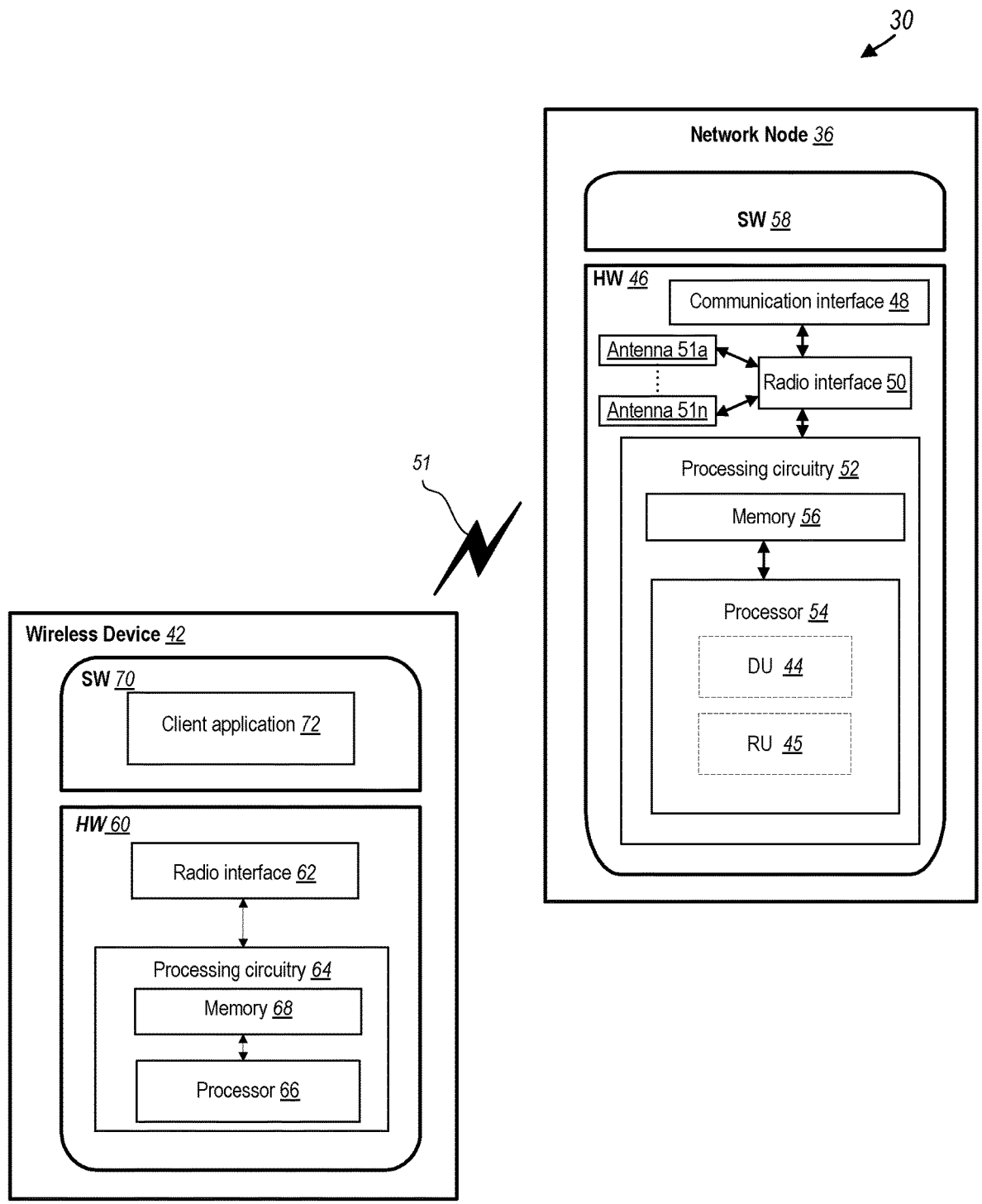
FIG. 12 is a block diagram of various entities in the communication system according to some embodiments of the present disclosure.

In some embodiments, the inner workings of the network node 36 and WD 42 may be as shown in FIG. 12 and independently, the surrounding network topology may be that of FIG. 11.

Although FIGS. 11 and 12 show "units" such as DU 44 and RU 45 as being within a respective processor, it is contemplated that these units may be implemented such that a portion of the unit is stored in a corresponding memory within the processing circuitry. In other words, one or more units may be implemented in hardware or in a combination of hardware and software within the processing circuitry.

Figure 13:
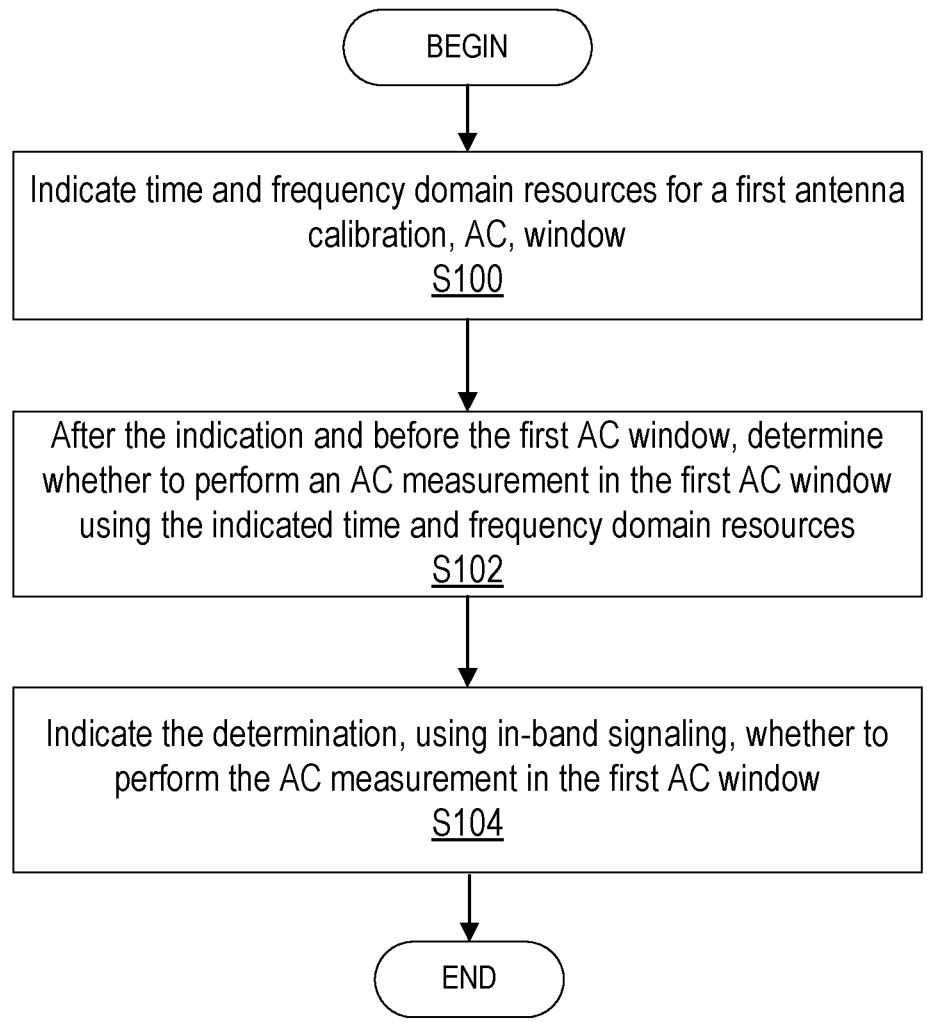
FIG. 13 is a flowchart of an example process in a network node according to some embodiments of the present disclosure.

FIG. 13 is a flowchart of an example process in a network node 36 according to some embodiments of the present disclosure. One or more Blocks and/or functions performed by network node 36 may be performed by one or more elements of network node 36 such as by DU 44 and/or RU 45 in processing circuitry 52, processor 54, radio interface 50, etc. In one or more embodiments, network node 36 such as via one or more of processing circuitry 52, processor 54, DU 44, RU 45, communication interface 48 and radio interface 50 is configured to indicate (Block S100) time and frequency domain resources for a first antenna calibration, AC, window, as described herein. In one or more embodiments, network node 36 such as via one or more of processing circuitry 52, processor 54, DU 44, RU 45, communication interface 48 and radio interface 50 is configured to, after the indication and before the first AC window, determine (Block S102) whether to perform an AC measurement in the first AC window using the indicated time and frequency domain resources, as described herein. In one or more embodiments, network node 36 such as via one or more of processing circuitry 52, processor 54, DU 44, RU 45, communication interface 48 and radio interface 50 is configured to indicate (Block S104) the determination, using in-band signaling, whether to perform the AC measurement in the first AC window, as described herein. In one or more embodiments, Blocks S100-S104 are performed by DU 44.

According to one or more embodiments, the in-band signaling uses at least one resource in a predefined pre-AC window to signal the determination. According to one or more embodiments, the indication of the determination to not perform the AC measurement in the first AC window is provided by the at least one resource being configured with a power greater than a predefined threshold. According to one or more embodiments, the indication of the determination to perform the AC measurement in the first AC window is provided by the at least one resource being configured with a power less than a predefined threshold.

According to one or more embodiments, the at least one resource is at least one orthogonal frequency-division multiplexing, OFDM, resource corresponding to a symbol of at least a subband, i.e., a subband or full band, at an end of a slot. According to one or more embodiments, the determination whether to perform the AC measurement in the first AC window is based at least on whether the time and frequency domain resources for the first AC window collide with delay sensitive data traffic. According to one or more embodiments, the network node includes a logical distributed unit 44, DU 44, and logical radio unit 45, RU 45, the in-band signaling corresponding to in-band signaling from the logical DU 44 to logical RU 45.

According to one or more embodiments, the logical DU 44 is one of physically separate from the RU 45 and physically collocated with the RU 45. According to one or more embodiments, the network node 36 such as via one or more of processing circuitry 52, processor 54, radio interface 50, DU 44, RU 45, etc., is further configured to determine a communication latency between the logical DU 44 to the logical RU 45, and where the time and frequency domain resources for the first AC window are based on the determined communication latency. According to one or more embodiments, the network node 36 such as via one or more of processing circuitry 52, processor 54, radio interface 50, DU 44, RU 45, etc., is further configured to: perform the AC measurement in the first AC window; at least temporarily store the AC measurement; and at least temporarily pause AC the uses of the AC measurement until a control plane confirmation indication has been received.

Figure 14:
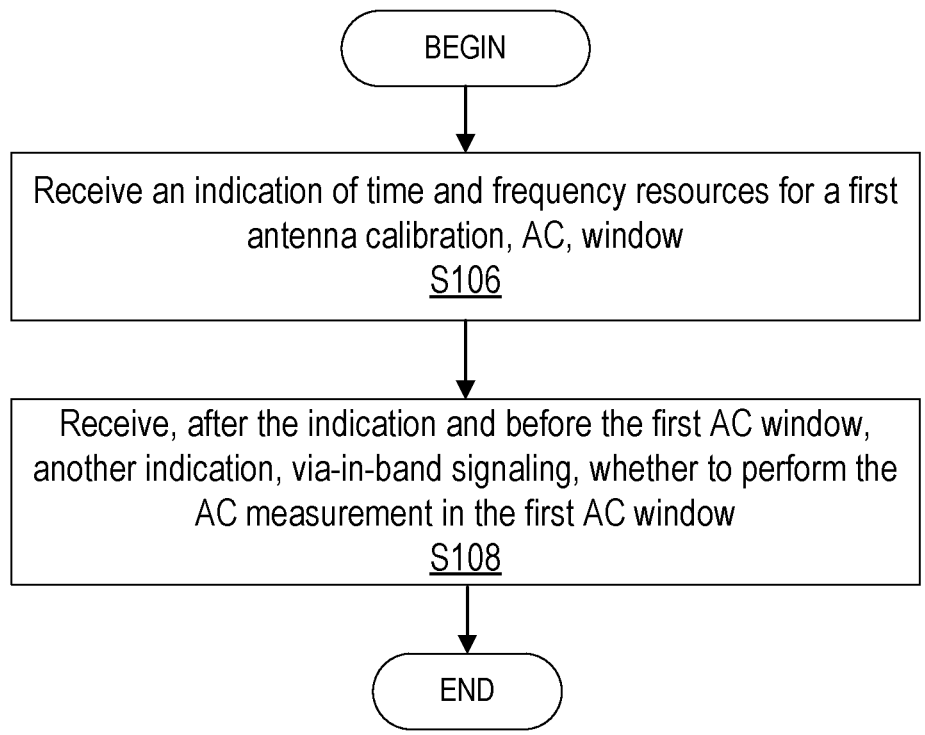
FIG. 14 is a flowchart of an example process in a radio unit according to some embodiments of the present disclosure.

FIG. 14 is a flowchart of an example process in a RU 45 according to some embodiments of the present disclosure. One or more Blocks and/or functions performed by network node 36 may be performed by RU 45. In one or more embodiments, RU 45 is configured to receive (Block S106) an indication of time and frequency resources for a first antenna calibration, AC, window, as described herein. In one or more embodiments, RU 45 is configured to receive (Block S108), after the indication and before the first AC window, another indication, via-in-band signaling, whether to perform the AC measurement in the first AC window, as described herein. Other functions performed by RU 45 are described herein.

Having generally described arrangements for AC scheduling such as in AAS, functions and processes are provided as follows, and which may be implemented by the network node 36 and wireless device 42.

Some embodiments provide AC scheduling such as in AAS.

High Level Signaling

Figure 6:
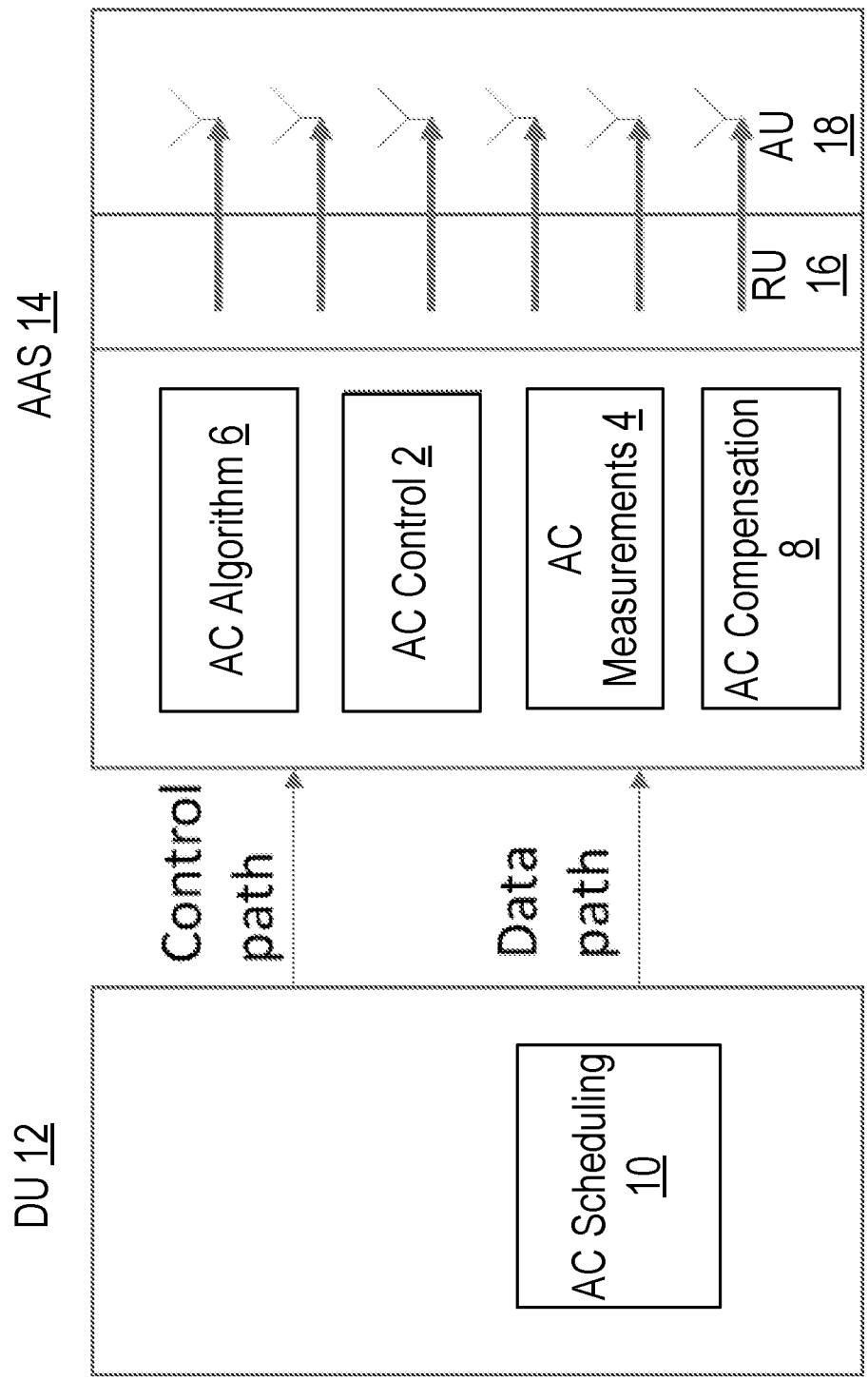
FIG. 6 is a block diagram of antenna calibration implementation in DU and AAS.
Figure 7:
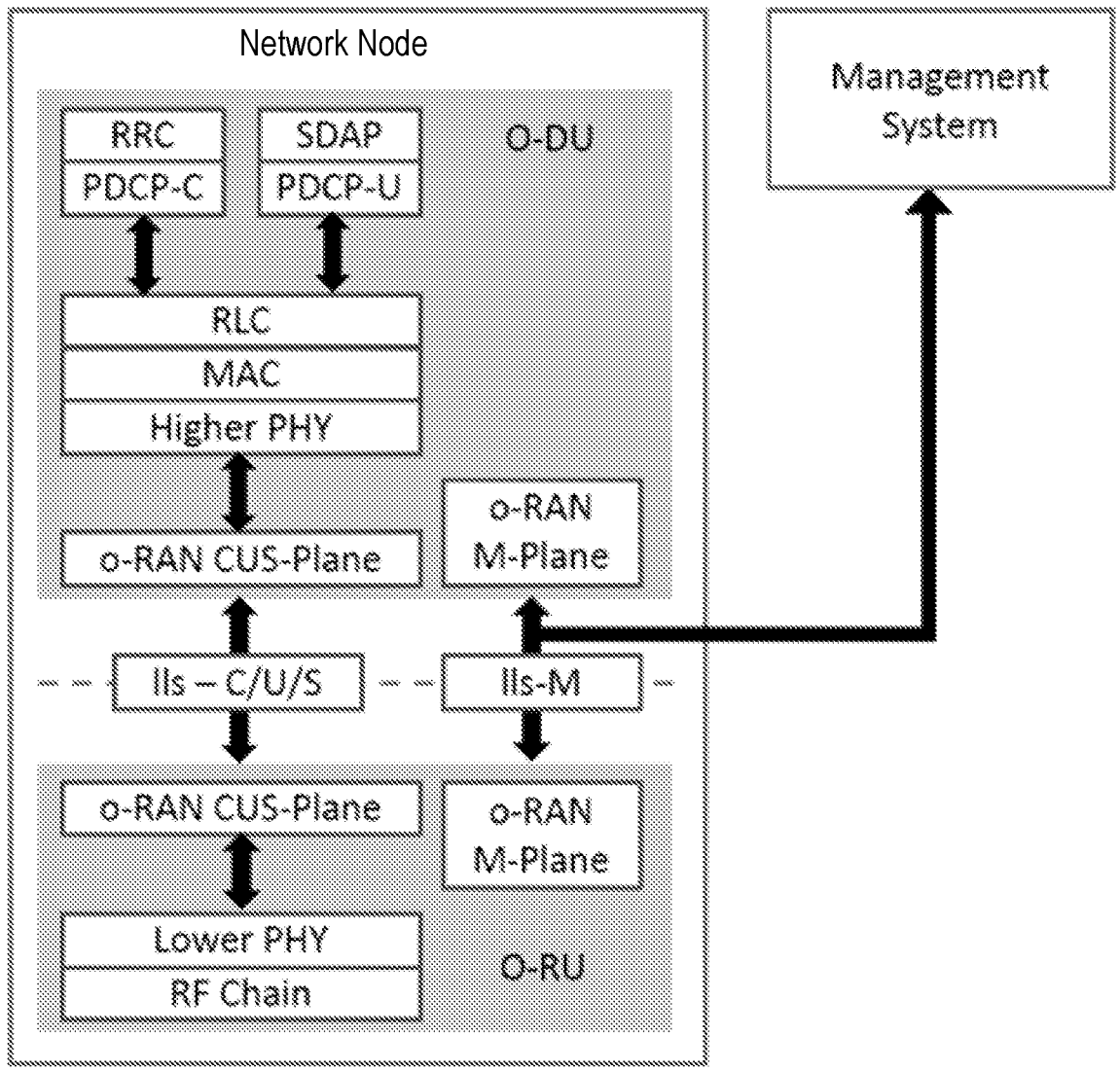
FIG. 7 is a block diagram of an open radio access network (ORAN) based system.
Figure 8:
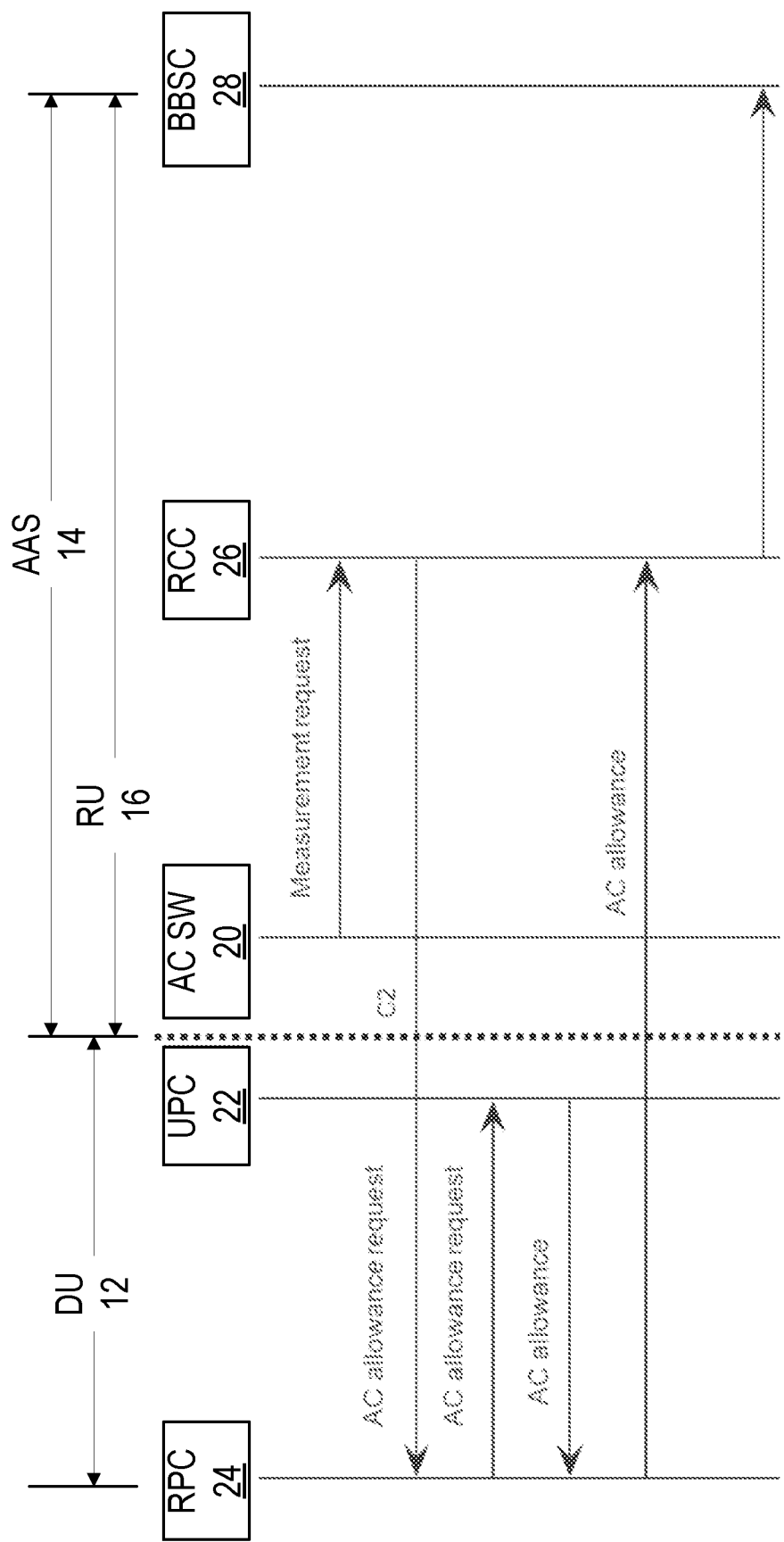
FIG. 8 is a signaling diagram of an antenna calibration scheduling method.
Figure 9:
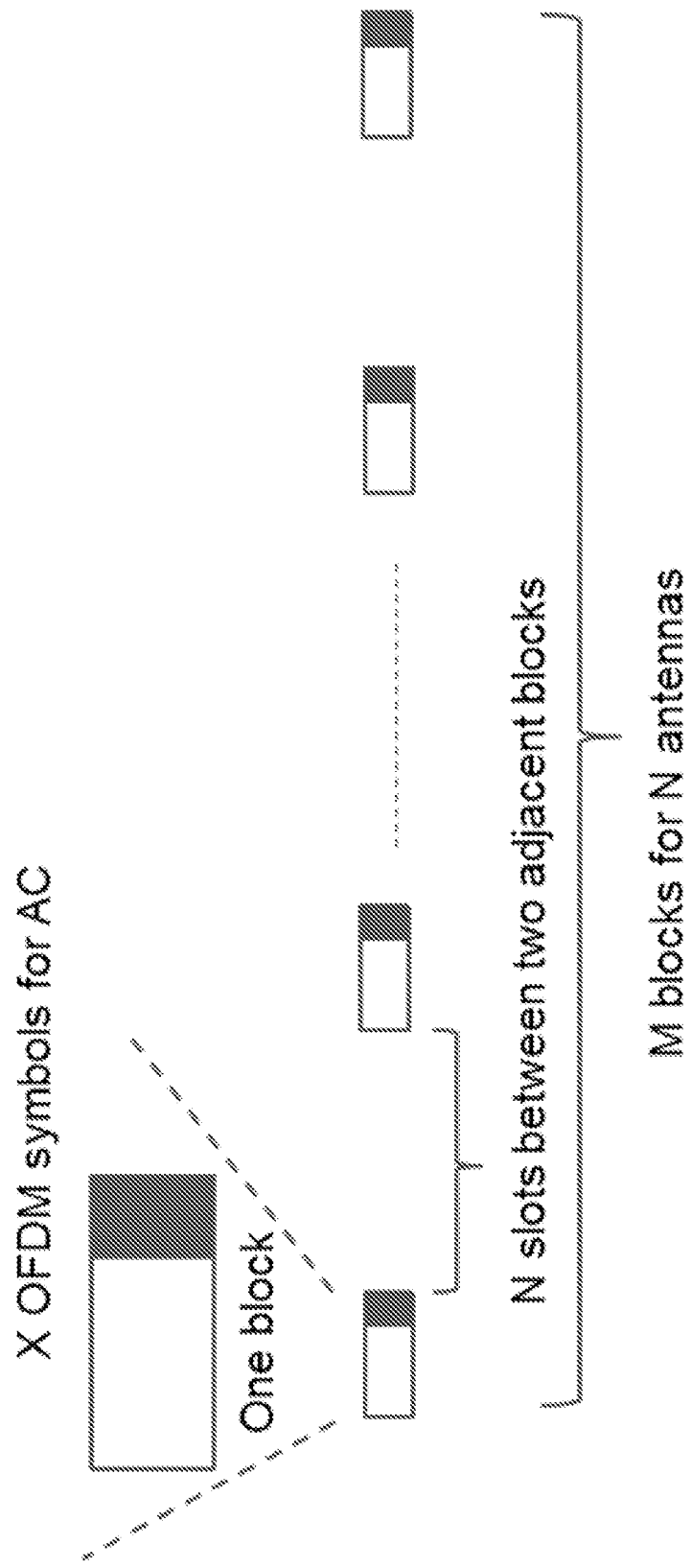
FIG. 9 is a diagram of an allocation of time domain resources for antenna calibration.
Figure 10:
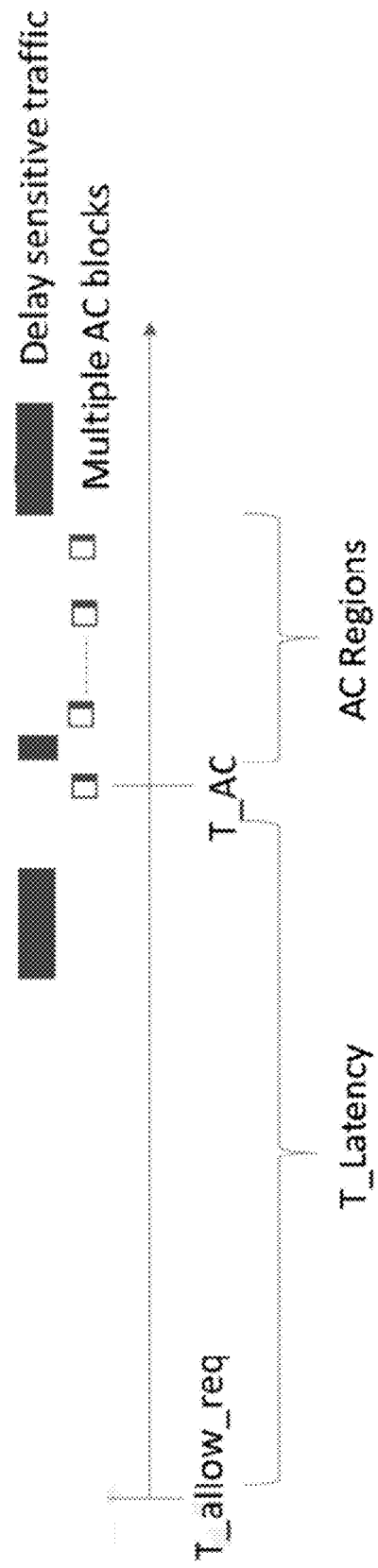
FIG. 10 is a diagram of example of timing of AC scheduling.
Figure 15:
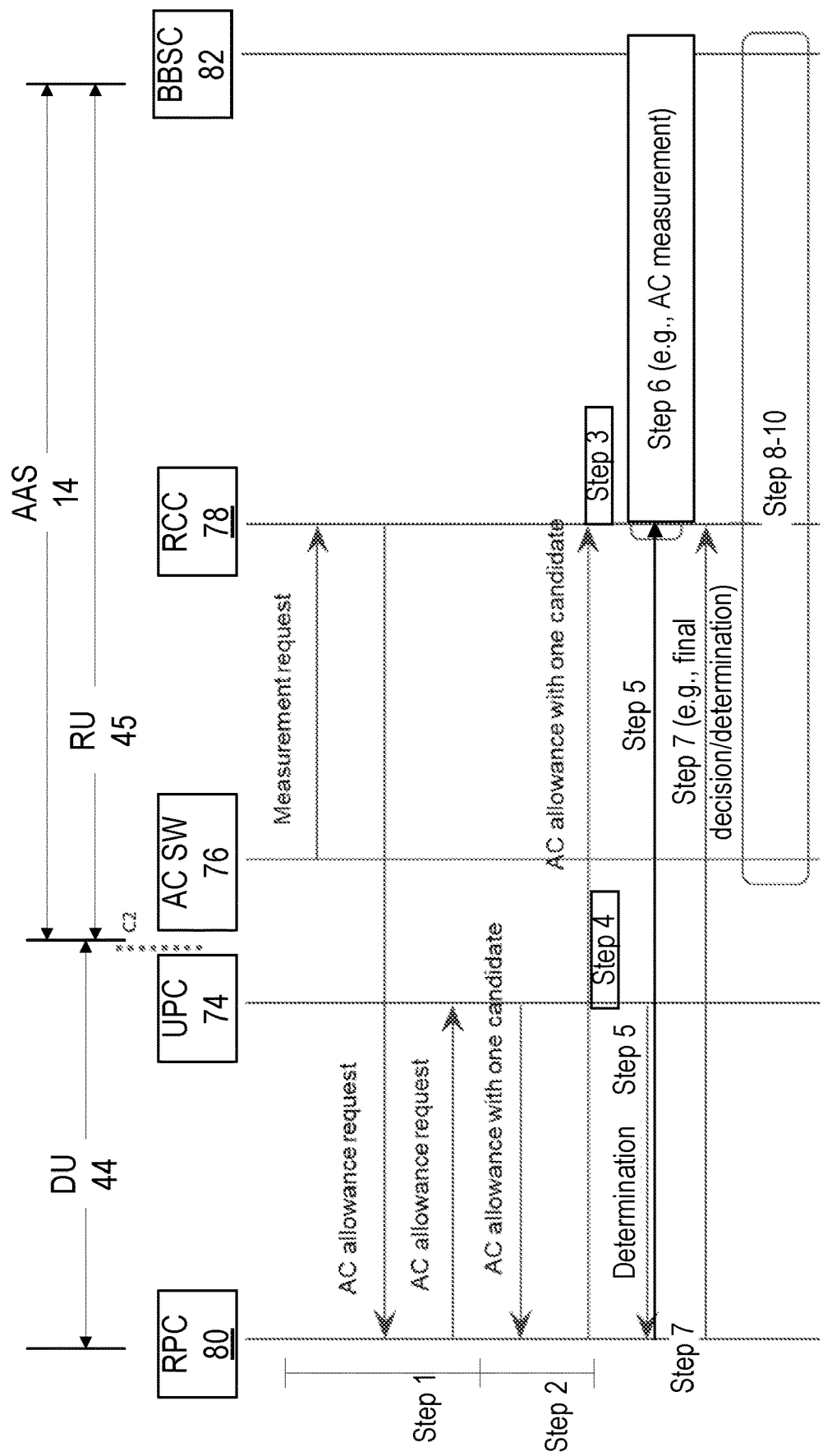
FIG. 15 is a signaling diagram of AC scheduling according to some embodiments of the present disclosure.

FIG. 15 is a high level signaling flow diagram showing a signal flow between DU 44 and AAS 14 for AC scheduling according to the principles of the disclosure. In particular, AAS 14 may be configured in accordance with the teachings described herein, such that AAS 14 in FIG. 15 has at least some different functionality with respect AAS 14 in FIGS. 6 and 8. At the DU 44 side, scheduling at the scheduler that resides inside the UPC 74 at DU 44. AC SW 76 corresponds to SW for AC control where the AC SW 76 is configured to send a measurement request/AC allowance request to the scheduler (i.e., to UPC 74) via RCC 78 and RPC 80. The scheduler returns the AC allowance back to the AAS 14. The AC allowance indicates when the AC measurement and AC should or is configured to occur and on which resources. When the time for AC measurement is approaching or when there is a predefined amount of time before the AC measurement is to occur, the scheduler may decide if the configured AC measurement should still be allowed to occur or if the configured AC measurement should be cancelled depending, for example, on the traffic condition. Signaling such as in-band signaling may be sent to the AAS 14 regarding whether the AC measurement will still occur according to the AC allowance. Afterwards, a final decision may be sent to AAS through control path (i.e., RPC and RCC) to indicate whether AC is dropped or not so that AAS can decide whether the AC measurement should be used for AC or discarded.

Referring now to the AAS 14 side, when the time for AC measurement is approaching or when there is a predefined amount of time before the AC measurement is to occur, the AAS is configured to detect the energy of the pre-AC window to determine whether to proceed with AC measurement, as described herein. After AC measurement, the AAS 14 is configured to at least temporarily store the captured data (i.e., AC measurement) in memory 56 until a final decision signal/message from the DU 44 is received or until timeout occurs. If the final decision signal/message indicates to allow AC or does not indicate to not allow AC, then the rest of the AC operations, such as AC algorithm and AC compensation, are performed by the AAS 14.

DU 44 Processing

Scheduling Procedure

The scheduling procedure in/at the DU 44 side will now be described. First, the following time stamps are defined:
  T_current: the time when the scheduler (i.e., scheduler at DU 44) receives an AC allowance request
  T_preAllow: the time when the scheduler sends the AC allowance
  T_real: the actual time when the AC measurement is performed
  T_timeout: the time when RCC 78 is configured to declare timeout and perform self-calibration/AC using the AC measurement
  Latency_DU_RU: a parameter characterizes the latency between the scheduler and AC control and may be either provisioned or measured.

Figure 16:
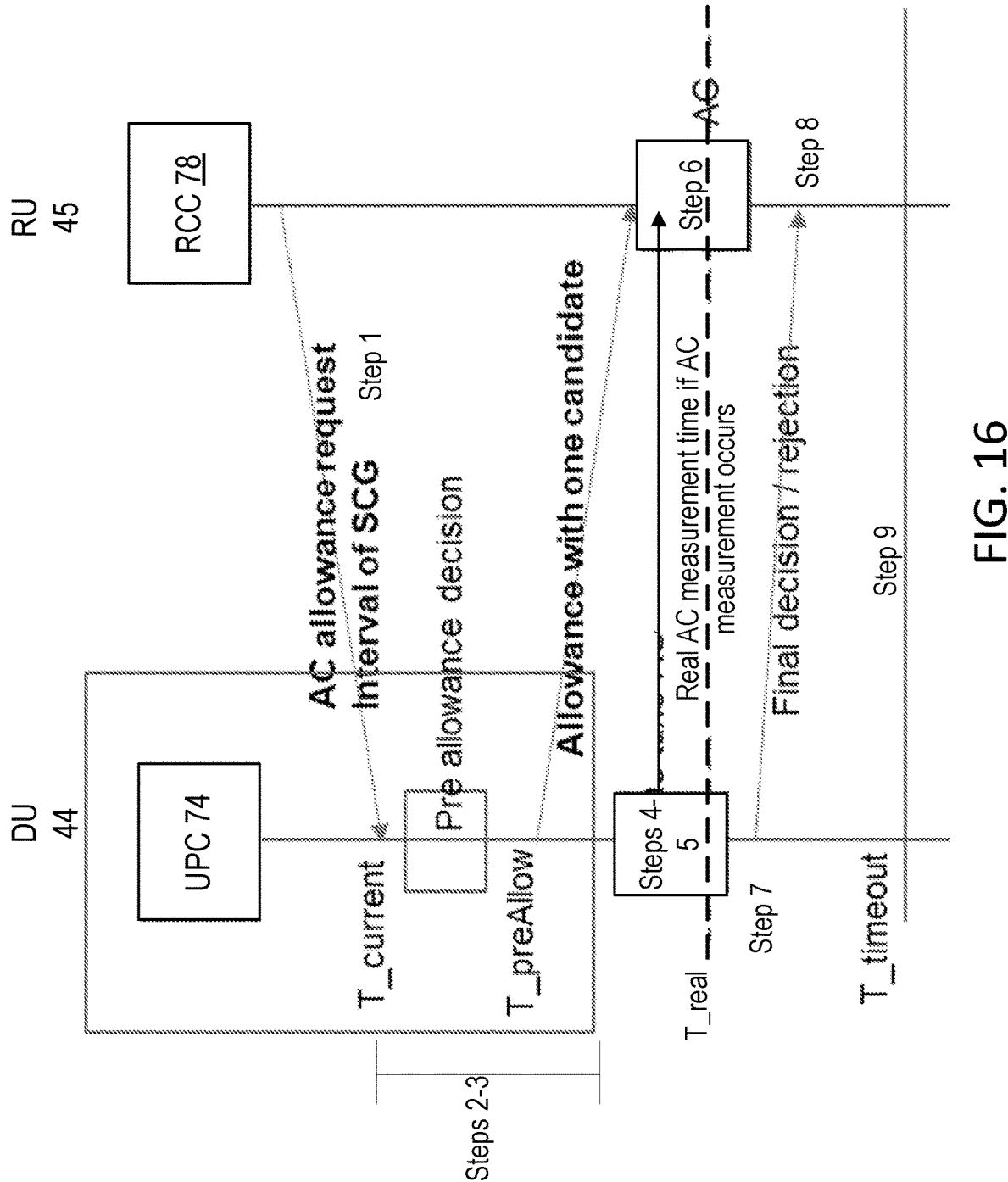
FIG. 16 is another signaling diagram for AC scheduling according to some embodiments of the present disclosure.

FIG. 16 is a signaling diagram for AC scheduling according to the principles of the disclosure. As illustrated in FIG. 16, the following steps are defined:
  1. When the scheduler receives an AC allowance request at T_current from AAS, the scheduler prepares the AC allowance that defines the time/frequency resources for AC measurement. The time when AC measurement is configured to occur may be specified in the AC allowance. The rough timing of the AC allowance is estimated by a current time, latency between DU 44 and AAS 14, and additional margin, i.e., T_current+Latency_DU_RU+A_Small_Margin). That is, the AC allowance may be based at least on a determined latency between DU 44 and RU 45/AAS 14. One goal in the timing may be to help ensure that AAS 14 receives the AC allowance slightly before the AC time such as within a predefined time period before the AC time. Existing systems may configure the AC allowance too early but being too early is not desired due to the varying nature of network traffic and being too late is not desired as AC may not be able to be performed.
  2. The scheduler sends the AC allowance. In some embodiments, the AC allowance is sent to the AAS immediately or within a predefined time period.
  3. The AAS 14 prepares to perform the AC measurement based on the AC allowance.

4. At the DU 44, when the time to perform AC measurement for AC is close or within a predefined time period from a current time, the scheduler at the DU 44 is configured to check whether the AC allowance sent at step 2 should be used. If the determination is to use the AC allowance sent at step 2, the AC measurement is performed by RU 45 based on the AC allowance. Otherwise, the AC measurement is not performed and the AC allowance may be discarded by RU 45 and/or AAS 14. If AC measurement is not performed, AC may likewise not be performed.
5. The determination (i.e., AC or not) whether to use the AC allocation sent at step 2 may be transmitted or communicated by DU 44 to RU 45 using or during the pre-AC window using in-band signaling.
6. At the AAS 14, when the time to perform AC measurement for AC is close or within a predefined time period from a current time, the BBSC 82 (baseband SW 82 inside AAS 14) at the AAS 14 performs energy detection on pre-defined pre-AC window, as described herein, to determine if the AC measurement according to the AC allowance should be performed, i.e., performs energy detection to receive the transmission of Step 4. The signal in the predefined pre-AC window may be provided by in-band signaling by DU 44. If the detected energy is lower than a threshold, then the determination decision indicates to perform AC measurement according to the AC allowance. Otherwise, if the detected energy is higher than a threshold, then the determination/decision indicates not to perform any AC measurement. Alternatively, if the detected energy is higher than a threshold, the indication may correspond to performing the AC measurement. The AC measurement may then be performed based on the indication indicated by, for example, the detected energy.
7. At the DU 44, a determination whether to use the AC measurement to perform AC may be performed and this final decision signal/message may be transmitted to the AAS 14 using control path signaling through RPC 80 and RCC 78.
8. When the AAS 14 receives the final decision signal from DU 44, the AAS 14 is configured to proceed as indicated in the final decision signal. The indication in the final decision signal may be to perform the rest of the AC steps including AC algorithm and compensation or to abort or cease AC. The final decision signal/message from DU 44 may be transmitted via higher layer communication through the control plane, which will be slower and time variant compared to in-band signaling using the data plane (as described in step 6). However, the control pane signaling should be more accurate compared to data plane signaling, and may be used to avoid false detection of in-band signaling.
9. If any messages/signaling (both AC allowance and final decision) is not received at the AAS 14 within a predefined timeout period, the AAS 14 is configured to send the allowance request again if it is periodic AC. If it is not periodic AC, the AAS 14 may perform self-calibration based AC.
10. After multiple failure or message timeouts, self-calibration based AC can be initiated by the AAS 14.

Some aspect of the process described above and system 30 are described in more detail below.

In-Band AC Indication Message in Pre-AC Window

When the time to perform AC measurement for AC is close or within a predefined time period from a current time, notification from the DU 44 to the AAS 14 in data path may be needed since signaling from control path take too much time and immediate signaling may be preferred. To enable this, a pre-AC window is defined. The pre-AC window is a small radio resource, such as one symbol with certain bandwidth that is ahead of the actual AC measurement time, that indicates whether to perform AC measurement. The distance to the first AC block is pre-determined and known to both DU 44 and AAS 14 in advance.

Figure 17:
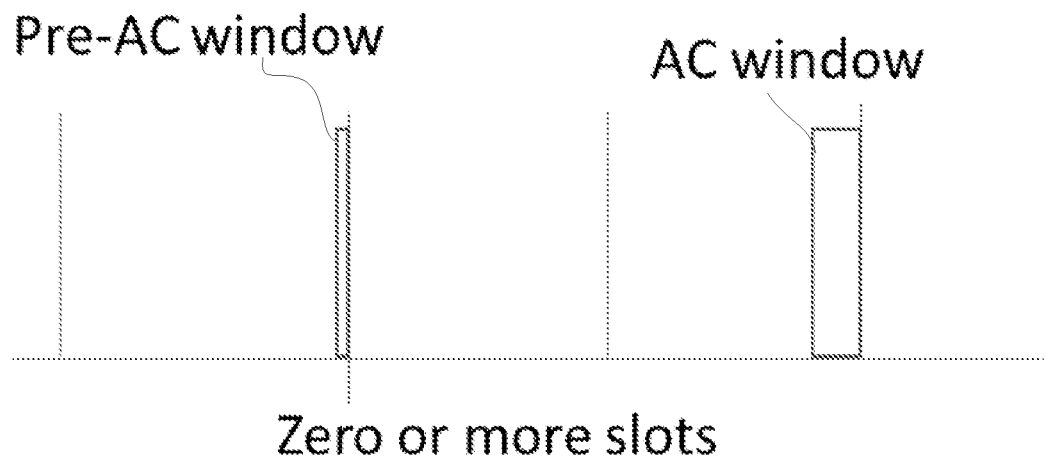
FIG. 17a is a block diagram of an example of a pre-AC window according to some embodiments of the present disclosure.
Figure 18:
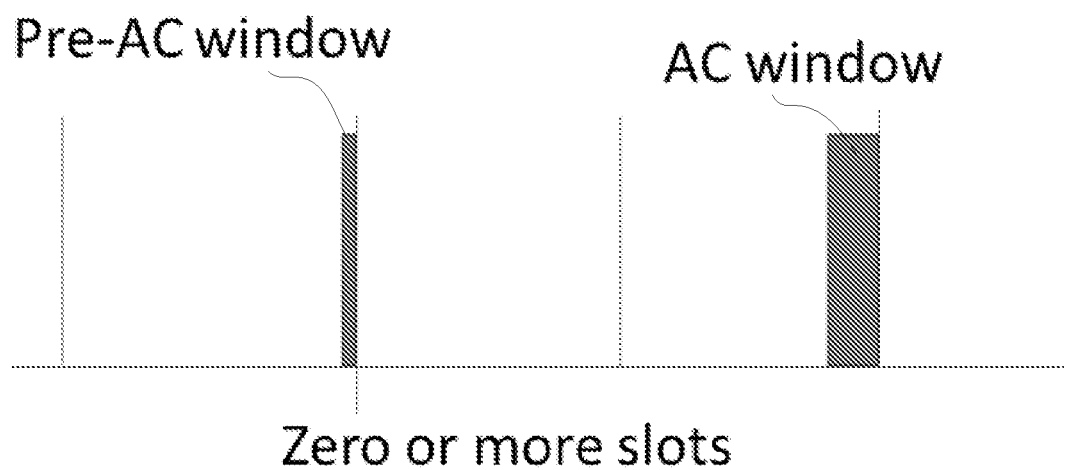
FIG. 18 is a block diagram of another example of a pre-AC window according to some embodiments of the present disclosure.

As shown in FIGS. 17 and 18, a pre-AC window is the pre-defined radio resource before the actual AC window (also called an AC block). If the indication indicates to perform AC measurement, a zero-power pre-AC window can be used. Otherwise, a non-zero power or full power pre-AC window may be used.

Latency Measurement from DU 44 to AAS 14

Figure 19:
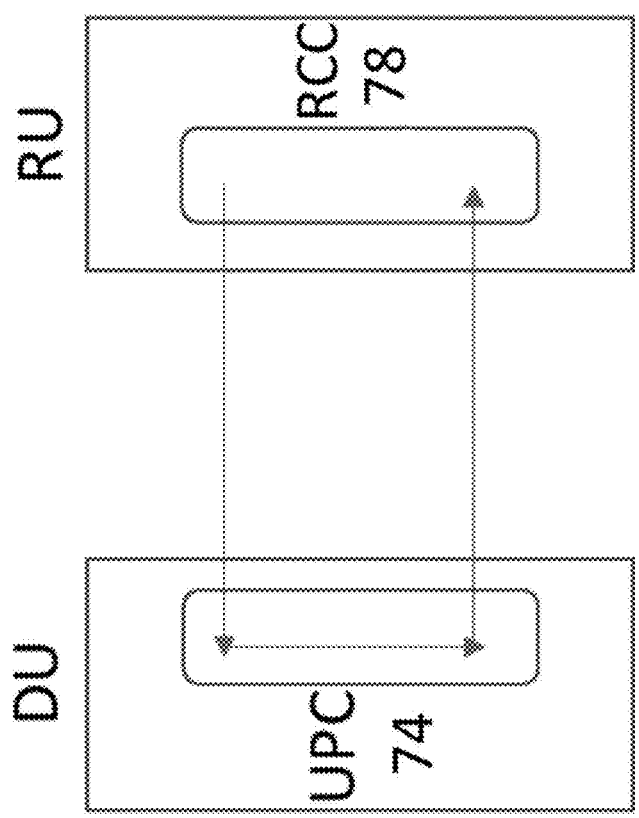
FIG. 19 is a signaling diagram of a latency measurement according to some embodiments of the present disclosure.

As described above, the DU 44 may need to know the latency from DU 44 to RU 45 in advance in order to create the AC allowance. FIG. 19 is an example of one option of how to estimate latency from the DU 44 to the AAS 14. When the AAS 14 sends an AC allowance request, the AAS 14 may include a time stamp in the AC allowance request message. When the scheduler at the DU 44 receives the message, the time difference between the time the AC allowance request message is received and the time it was sent can be assumed to be the same as the latency from the scheduler at the DU 44 to the AAS 14 (RU 45).

AC Allowance Creation

Figure 20:
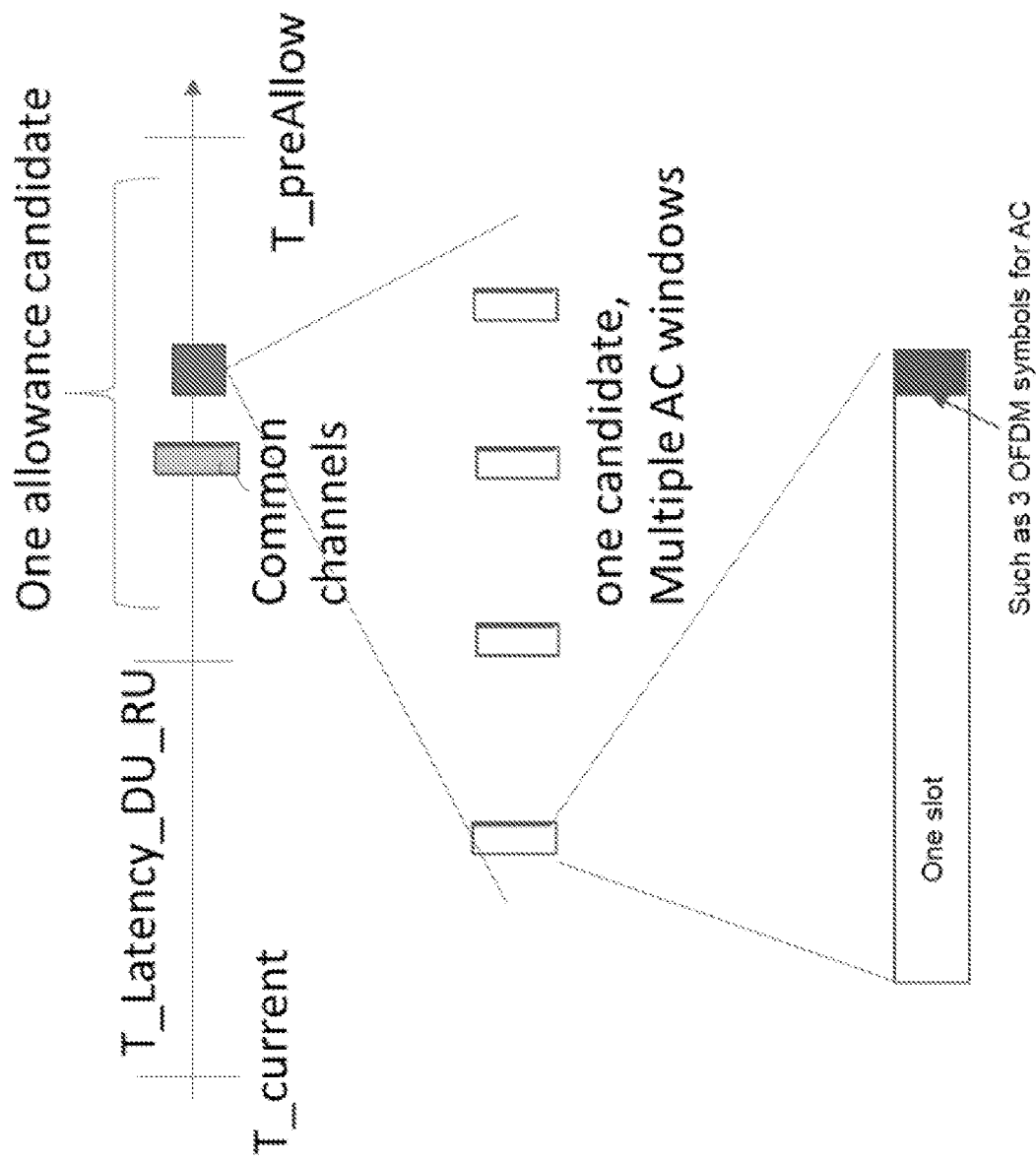
FIG. 20 is a diagram of an example of DU processing for AC allowance according to some embodiments of the present disclosure.
Figure 21:
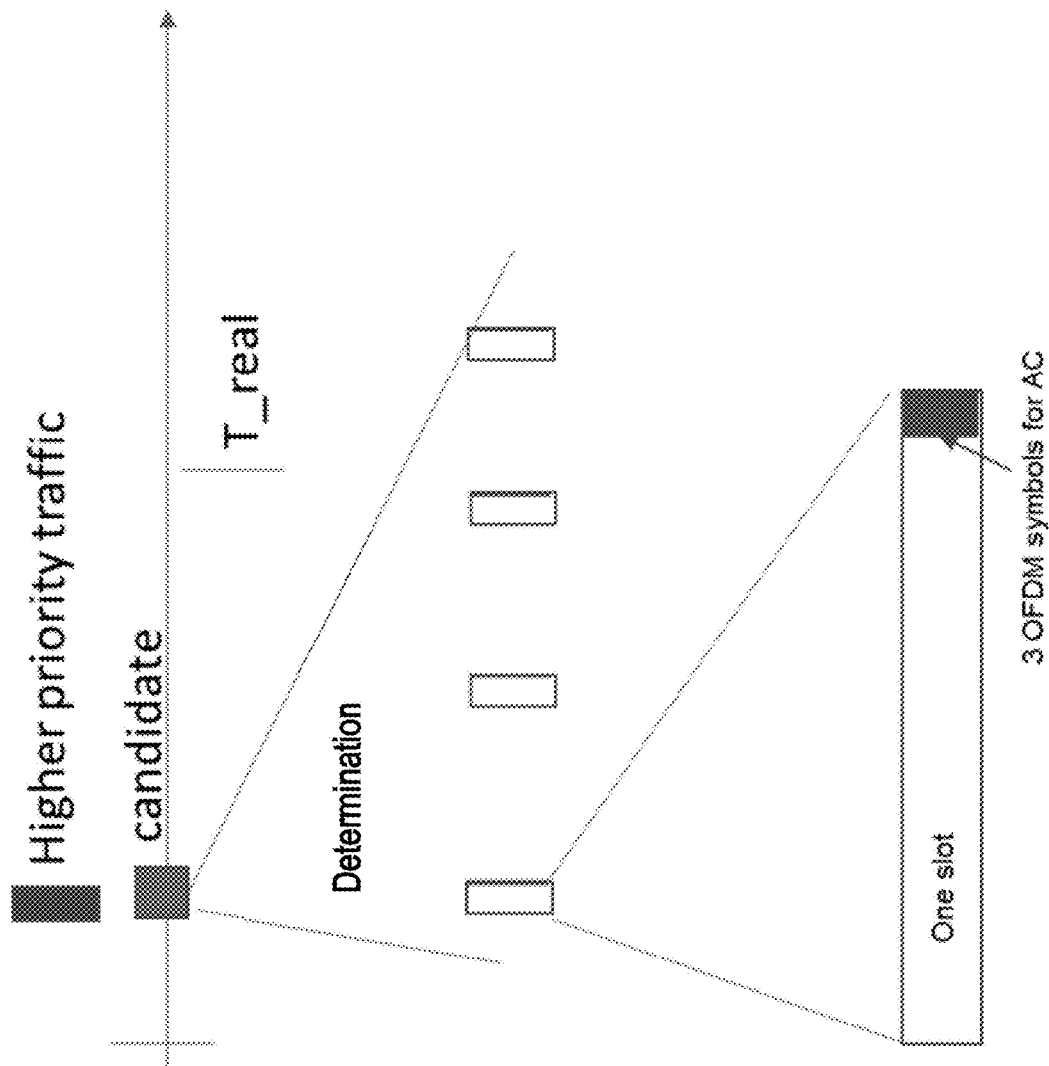
FIG. 21 is a diagram of another example of DU processing according to some embodiments of the present disclosure.

At the scheduler in DU 44, after receiving AC allowance request, an AC allowance may need to be sent to the AAS immediately or within a short time period due to the latency. The AC allowance specifies the exact timing and resource used for AC measurement at a future time. As illustrated in FIG. 20, the time and resources may be determined ahead of time by considering the estimated latency from the DU 44 to the AAS 14, i.e., T_Latency_DU_RU, and other pre-defined traffic that is known to the scheduler. The AC allowance may have x number of blocks such as, for example, 4 blocks for 32 antennas and each block for 8 antennas. An example of the candidate is illustrated in FIG. 21. The scheduler may need to ensure that non-traffic channels (i.e., common channels that are known to scheduler in advance) will not collide with at least one or more of the blocks.

AC Scheduling Procedure Close to AC/AC Measurement Time

When the time to perform AC measurement for AC is close or within a predefined time period from a current time, the scheduler may have better "visibility" on whether the AC allowance that has already been indicated to the AAS 14 is feasible given the current traffic condition, i.e., whether the AAS 14 should still use the AC allowance for AC measurement given the current traffic or traffic expected during the AC window. If the scheduler determines the chance/likelihood that the critical or delay sensitive traffic will collide with previously committed AC resources in the AC allowance is below a predefined threshold, the scheduler allows AC measurement/AC to proceed. As illustrated in FIG. 21, if there is at least one AC block colliding with critical or delay sensitive traffic, the AC measurement according to the AC allowance is not allowed to proceed. The decision may be sent to the AAS 14 using the pre-AC resource as described above, i.e., using the in-band signaling indication message. The decision may also be sent to the AAS 14 via control path signaling (RPC 80 and RCC 78).

AAS Processing

Energy Detection on Pre-AC Resource and AC Measurement

At the AAS 14, received energy associated with the pre-AC window can be obtained by sampling the frequency domain samples in the pre-AC window as shown below:

$$P = \frac{1}{N}\sum_{i=1}^{N} \text{Samples}^{\wedge}2,$$

where N is a number of samples within pre-AC window. These samples may be uniformly collected/sampled from the entire frequency samples within the pre-AC window. Whether AC measurement is to occur may be determined by comparing the power P with a pre-determined threshold P_th. If it is less than the threshold, zero power is assumed, and AC measurement is allowed to occur. Otherwise, AC measurement does not occur such that the AC allowance may be discarded.

The number of selected samples within the pre-AC window may be chosen to reduce the calculation complexity.

Figure 22:
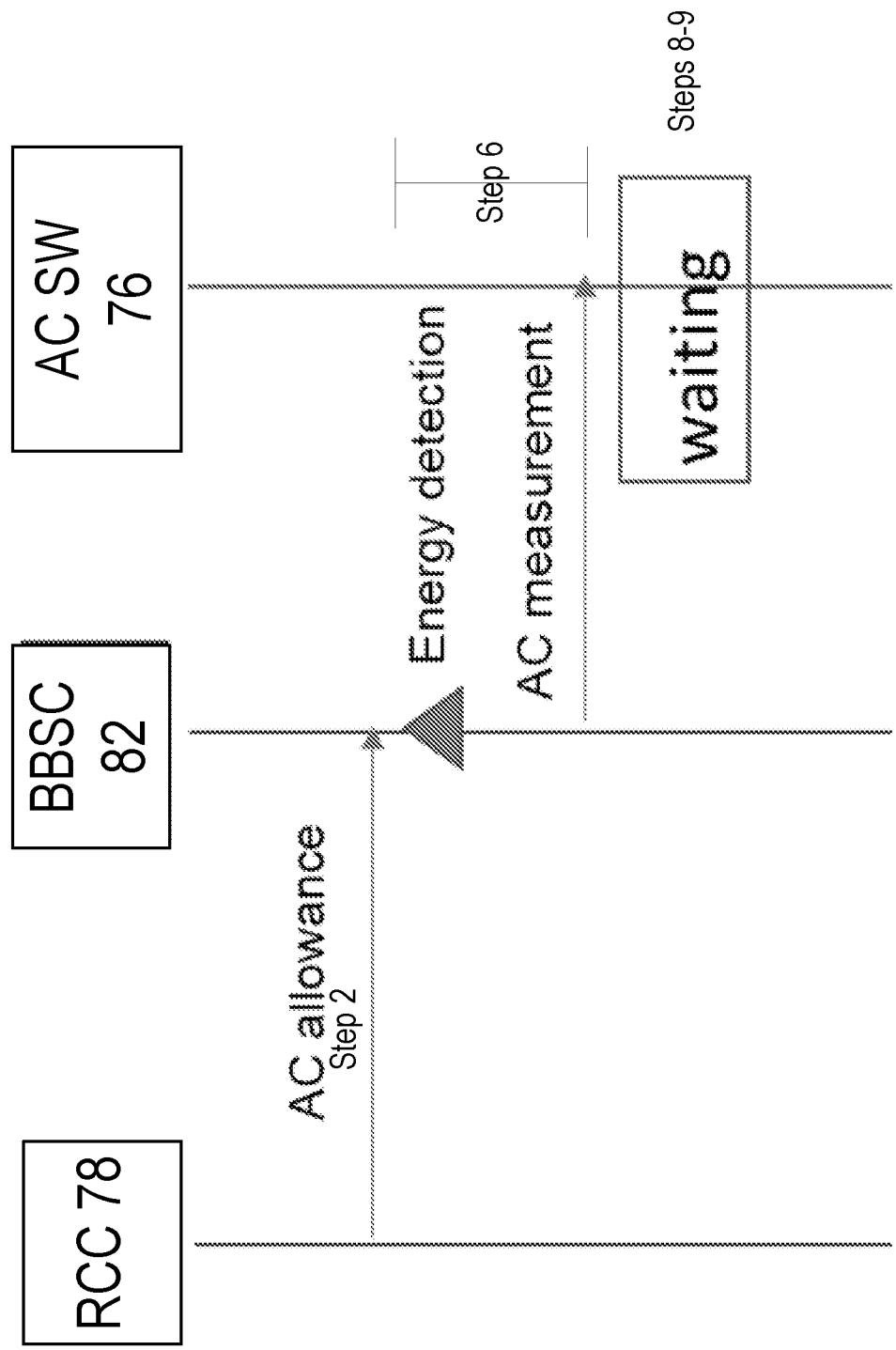
FIG. 22 is a diagram of an example AAS processing according to some embodiments of the present disclosure.

As illustrated in the signaling diagram of FIG. 22, if the AC measurement is expected after energy detection, the AC measurement may be performed by BBSC 82, a BB SW within the AAS 14. Afterwards, the AC algorithm and AC compensation may wait for a final decision signal to decide if the AC algorithm will proceed, or may wait until timeout occurs. The AC measurement result may be stored temporarily in the memory 56 storage.

AC Algorithm/Compensation or Allowance Request Retransmission

Figure 23:
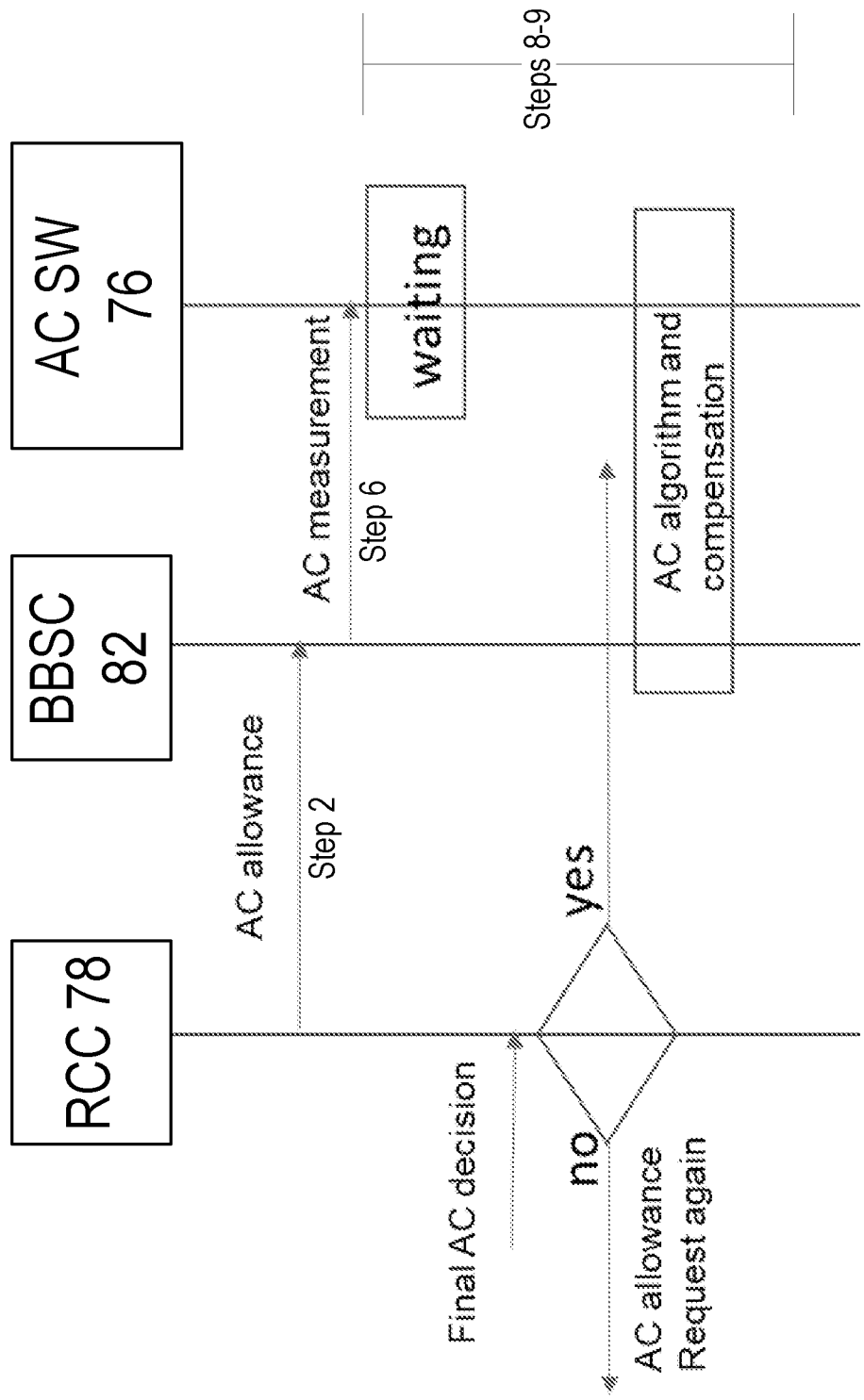
FIG. 23 is a diagram of another example of AAS processing according to some embodiments of the present disclosure.

As illustrated in the signaling diagram of FIG. 23, once the final decision from the DU 44 has been received at the AAS 14 and if the final decision indicates to allow AC, the AC measurement result is used for the subsequent AC algorithm. If the final decision (also referred to as the final decision message/signaling) indicates to drop the AC, AAS 14 is configured to drop the current AC cycle, discards the measurement, and sends AC allowance request again. In one or more embodiments, if timeout occurs, the AC may be dropped or the AC may be performed.

Therefore, one or more embodiments described herein may provide one or more of the following advantages:

Achieve a high-performance AC given extra latency between Radio and AAS 14 and unpredictable traffic condition.

Have minimal impact on traffic such as critical or delay sensitive traffic.

Is beneficial in case of a high traffic load scenario.

Applies to both UL and DL.

It is beneficial for ORAN.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
- AAS active antenna system
- AC antenna calibration
- AU antenna unit
- BB baseband
- DU digital unit
- O-DU ORAN DU
- ORAN open RAN
- O-RU ORAN RU
- RU radio unit It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, configured to:
   indicate time and frequency domain resources for a first antenna calibration, AC, window;
   after the indication and before the first AC window, determine whether to perform an AC measurement in the first AC window using the indicated time and frequency domain resources; and
   indicate the determination, using in-band signaling, whether to perform the AC measurement in the first AC window.

2. The network node of claim 1, wherein the in-band signaling uses at least one resource in a predefined pre-AC window to signal the determination.

3. The network node of claim 2, wherein the indication of the determination to not perform the AC measurement in the first AC window is provided by the at least one resource being configured with a power greater than a predefined threshold.

4. The network node of claim 2, wherein the indication of the determination to perform the AC measurement in the first AC window is provided by the at least one resource being configured with a power less than a predefined threshold.

5. The network node of claim 2, wherein the at least one resource is at least one orthogonal frequency-division multiplexing, OFDM, resource corresponding to a symbol of at least a subband at an end of a slot.

6. The network node of claim 1, wherein the determination whether to perform the AC measurement in the first AC window is based at least on whether the time and frequency domain resources for the first AC window collide with delay sensitive data traffic.

7. The network node of claim 1, wherein the network node includes a logical distributed unit, DU, and logical remote unit, RU, the in-band signaling corresponding to in-band signaling from the logical DU to logical RU.

8. The network node of claim 7, wherein the logical DU is one of physically separate from the RU and physically collocated with the RU.

9. The network node of claim 7, wherein the network node is further configured to determine a communication latency between the logical DU to the logical RU; and
   the time and frequency domain resources for the first AC window being based on the determined communication latency.

10. The network node of claim 1, wherein the network node is further configured to:
    perform the AC measurement in the first AC window;
    at least temporarily store the AC measurement; and
    at least temporarily pause use of the AC measurement until a control plane confirmation indication has been received.

11. A method implemented by a network node, the method comprising:
    indicating time and frequency domain resources for a first antenna calibration, AC, window;
    after the indication and before the first AC window, determining whether to perform an AC measurement in the first AC window using the indicated time and frequency domain resources; and
    indicating the determination, using in-band signaling, whether to perform the AC measurement in the first AC window.

12. The method of claim 11, wherein the in-band signaling uses at least one resource in a predefined pre-AC window to signal the determination.

13. The method of claim 12, wherein the indication of the determination to not perform the AC measurement in the first AC window is provided by the at least one resource being configured with a power greater than a predefined threshold.

14. The method of claim 12, wherein the indication of the determination to perform the AC measurement in the first AC window is provided by the at least one resource being configured with a power less than a predefined threshold.

15. The method of claim 12, wherein the at least one resource is at least one orthogonal frequency-division multiplexing, OFDM, resource corresponding to a symbol of at least a subband at an end of a slot.

16. The method of claim 11, wherein the determination whether to perform the AC measurement in the first AC window is based at least on whether the time and frequency domain resources for the first AC window collide with delay sensitive data traffic.

17. The method of claim 11, wherein the network node includes a logical distributed unit, DU, and logical remote unit, RU, the in-band signaling corresponding to in-band signaling from the logical DU to logical RU.

18. The method of claim 17, wherein the logical DU is one of physically separate from the RU and physically collocated with the RU.

19. The method of claim 17, further comprising determining a communication latency between the logical DU to the logical RU; and
    the time and frequency domain resources for the first AC window being based on the determined communication latency.

20. The method of claim 11, further comprising:
    performing the AC measurement in the first AC window;
    at least temporarily storing the AC measurement; and
    at least temporarily pausing use of the AC measurement until a control plane confirmation indication has been received.

* * * * *